US012259718B2

United States Patent
Chen et al.

(10) Patent No.: US 12,259,718 B2
(45) Date of Patent: Mar. 25, 2025

(54) DEBUGGING METHOD AND APPARATUS FOR PRODUCTION LINE DEVICES AND PRODUCTION LINE SYSTEM

(71) Applicant: CONTEMPORARY AMPEREX TECHNOLOGY (HONG KONG) LIMITED, Hong Kong (CN)

(72) Inventors: Jiwei Chen, Fujian (CN); Guannan Jiang, Fujian (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 9 days.

(21) Appl. No.: 18/131,373

(22) Filed: Apr. 6, 2023

(65) Prior Publication Data

US 2024/0012401 A1 Jan. 11, 2024

Related U.S. Application Data

(63) Continuation of application No. PCT/CN2022/104186, filed on Jul. 6, 2022.

(51) Int. Cl.
G05B 19/418 (2006.01)
G06T 7/00 (2017.01)

(52) U.S. Cl.
CPC .. *G05B 19/41875* (2013.01); *G05B 19/41865* (2013.01); *G06T 7/0004* (2013.01)

(58) Field of Classification Search
None
See application file for complete search history.

(56) References Cited

U.S. PATENT DOCUMENTS

| | | | | |
|---|---|---|---|---|
| 6,212,650 | B1 * | 4/2001 | Guccione | G06F 30/34 |
| | | | | 714/38.14 |
| 6,324,298 | B1 * | 11/2001 | O'Dell | G01N 21/8803 |
| | | | | 257/E21.53 |
| 7,383,536 | B1 | 6/2008 | Petry, III et al. | |
| 8,068,660 | B2 | 11/2011 | Nair et al. | |
| 9,225,880 | B2 * | 12/2015 | Altieri | H04N 23/00 |
| 9,955,123 | B2 * | 4/2018 | Oostendorp | G06T 7/0004 |
| 10,861,148 | B2 * | 12/2020 | Wang | G06T 7/001 |

(Continued)

FOREIGN PATENT DOCUMENTS

| | | | |
|---|---|---|---|
| CN | 111538308 B | * | 9/2020 |
| CN | 113495162 A | | 10/2021 |

(Continued)

OTHER PUBLICATIONS

International Search Report and Written Opinion mailed on Mar. 20, 2023, received for PCT Application PCT/CN2022/104186, filed on Jul. 6, 2022, 15 pages including English Translation.

(Continued)

*Primary Examiner* — Jason Lin
(74) *Attorney, Agent, or Firm* — XSENSUS LLP

(57) ABSTRACT

A debugging method for production line devices may include: receiving control commands for a plurality of first devices in a production line, where respective control programs may be configured for the plurality of first devices; and calling the control programs for the plurality of first devices according to the control commands for the plurality of first devices respectively so as to debug the plurality of first devices.

19 Claims, 14 Drawing Sheets

(56) References Cited

U.S. PATENT DOCUMENTS

| | | | |
|---|---|---|---|
| 2003/0026457 A1* | 2/2003 | Nahum | G06V 10/7515 |
| | | | 382/106 |
| 2004/0146295 A1* | 7/2004 | Furman | G01N 21/95607 |
| | | | 398/9 |
| 2006/0088201 A1* | 4/2006 | Delaney | H04N 23/74 |
| | | | 382/152 |
| 2009/0297042 A1 | 12/2009 | Nair et al. | |
| 2011/0087452 A1* | 4/2011 | Huang | G06F 11/2284 |
| | | | 702/117 |
| 2012/0102309 A1* | 4/2012 | Lin | G06F 11/2294 |
| | | | 713/2 |
| 2012/0130520 A1* | 5/2012 | Parikh | G05B 19/41875 |
| | | | 700/96 |
| 2013/0229511 A1 | 9/2013 | Oostendorp et al. | |
| 2019/0089932 A1 | 3/2019 | Oostendorp et al. | |
| 2021/0096543 A1* | 4/2021 | Stump | G06F 8/34 |
| 2022/0086399 A1 | 3/2022 | Oostendorp et al. | |

FOREIGN PATENT DOCUMENTS

| | | | |
|---|---|---|---|
| CN | 113566864 A | * | 10/2021 |
| CN | 114138458 A | | 3/2022 |
| EP | 2 784 746 A1 | | 1/2014 |

OTHER PUBLICATIONS

Extended European Search Report issued Dec. 1, 2023, in corresponding European Patent Application No. 22873959.5, 11 pages.

\* cited by examiner

800

| Receive a light source on command and/or a light source off command for a target light source control device in a plurality of light source control devices | ⟿ S810 |

| Call a control program for the target light source control device according to the light source on command for the target light source control device so as to control a light source corresponding to the target light source control device to turn on | ⟿ S820 |

| Call the control program for the target light source control device according to the light source off command for the target light source control device so as to control the light source corresponding to the target light source control device to turn off | ⟿ S830 |

FIG. 8

| PLC debugging | | | | | | | | | | Write PLC | |
|---|---|---|---|---|---|---|---|---|---|---|---|

Soft PLC elements

| Number | Name | Sign | Address | Bit | Data type | Length | RW | Adjustment value |
|---|---|---|---|---|---|---|---|---|
| 1 | PLC trigger | PLC_Trigger | 4000 | 0 | Bit Type | 1 | Read & write | 255 |
| ⋮ | ⋮ | ⋮ | ⋮ | ⋮ | ⋮ | ⋮ | ⋮ | ⋮ |

Write PLC

| Name | PLC trigger |
|---|---|
| Address | 4000 |
| Bit | 0 |
| Adjustment value | |

Write

FIG. 15

DEBUGGING METHOD AND APPARATUS FOR PRODUCTION LINE DEVICES AND PRODUCTION LINE SYSTEM

CROSS-REFERENCE TO RELATED APPLICATION

The present application is a continuation of International Application No. PCT/CN2022/104186, filed Jul. 6, 2022, which is incorporated herein by reference in its entirety.

TECHNICAL FIELD

Embodiments of this application relate to the field of production line inspection technologies, and more specifically, to a debugging method and apparatus for production line devices and a production line system.

BACKGROUND

As time advances, in the production and manufacturing process of various products, production lines are increasingly streamlined and mechanized, and various types of devices in the production lines cooperate with each other to realize the production of products and related monitoring of the production process.

At present, in some production lines, visual inspection devices such as cameras and light sources are deployed to take pictures of the products on the production line so as to inspect the production and manufacturing conditions of the products. If no adjustments are made, the visual inspection devices can provide only one same visual solution. However, the same visual solution in different environments may affect imaging, resulting in reduced ability to inspect the products, thereby affecting the performance of the production line. In view of this, how the performance of a production line is improved is an urgent technical problem to be resolved.

SUMMARY

Embodiments of this application provide a debugging method and apparatus for production line devices and a production line system, able to improve performance of production lines.

According to a first aspect, a debugging method for production line devices is provided, including: receiving control commands for a plurality of first devices in a production line, where respective control programs are configured for the plurality of first devices; and calling the control programs for the plurality of first devices according to the control commands for the plurality of first devices respectively so as to debug the plurality of first devices.

In the technical solution of the embodiments of this application, an execution subject (for example, debugging apparatus) of the debugging method can receive control commands for a plurality of first devices from an upper layer (for example, user), and call, according to the control commands, control programs corresponding to the plurality of first devices to control the plurality of first devices so as to debug the plurality of first devices. This debugging solution enables the plurality of first devices to meet requirements of different environments and can locate possible problems of the plurality of first devices, thereby improving the performance of the production line to which the plurality of first devices belong. In addition, in this technical solution, the execution subject of the debugging method can provide a unified interface for the upper layer (for example, user) to control the plurality of first devices, and the execution subject can screen the upper layer from specific control of a lower layer for the plurality of first devices, so the upper layer does not need to perform different operations on first devices of different models or from different manufacturers, but only needs to use the control commands to implement control on the first devices of different models or from different manufacturers. In this way, the debugging for the plurality of first devices becomes simple and unified, and the experience of the upper layer (for example, user) in debugging a plurality of first devices can be optimized.

In some possible implementations, the debugging method includes: receiving first function control commands for the plurality of first devices; and calling the control programs for the plurality of first devices according to the first function control commands for the plurality of first devices respectively so as to execute a first function on each of the plurality of first devices.

In the technical solution of these implementations, the control commands for the plurality of first devices can include the first function control commands, and the debugging apparatus can receive the first function control commands for the plurality of first devices through a same interface, and debug the plurality of first devices according to the first function control commands for the plurality of first devices to inspect whether the plurality of first devices can perform the first function properly, thus providing debugging specific to the plurality of first devices, improving the debugging effect and the overall performance of the production line.

In some possible implementations, the plurality of first devices include a first target device, and the first function control command includes a connect command and/or a disconnect command; where the calling the control programs for the plurality of first devices according to the first function control commands for the plurality of first devices respectively so as to execute a first function on each of the plurality of first devices includes: calling a control program for the first target device according to a connect command for the first target device so as to connect the first target device; and/or calling the control program for the first target device according to a disconnect command for the first target device so as to disconnect the first target device.

The technical solution of these implementations provides a connect function and/or disconnect function for debugging the first target device in the plurality of first devices, which can ensure normal communication between the first target device and the debugging apparatus and can reflect whether the first target device is running properly so as to ensure the debugging effect and help accurately locate relevant problems of the first target device.

In some possible implementations, the plurality of first devices include a plurality of image acquisition devices, and the first function control command includes a trigger command; where the calling the control programs for the plurality of first devices according to the first function control commands for the plurality of first devices respectively so as to execute a first function on each of the plurality of first devices includes: calling, according to a trigger command for a target image acquisition device in the plurality of image acquisition devices, a control program for the target image acquisition device so as to trigger the target image acquisition device to acquire an image.

The technical solution of these implementations provides debugging of the function of triggering the target image acquisition device in the plurality of image acquisition devices, facilitating the ability to inspect whether the target image acquisition device is normally triggered and allowing convenient control of the triggering of the target image acquisition device according to actual needs.

In some possible implementations, the first function control command further includes a hardware trigger mode setting command and/or a software trigger mode setting command; and before the calling, according to a trigger command for a target image acquisition device, a control program for the target image acquisition device so as to trigger the target image acquisition device to acquire an image, the triggering method further includes: calling the control program for the target image acquisition device according to a hardware trigger mode setting command for the target image acquisition device so as to set a trigger mode of the target image acquisition device to a hardware trigger mode; and/or calling the control program for the target image acquisition device according to a software trigger mode setting command for the target image acquisition device so as to set a trigger mode of the target image acquisition device to a software trigger mode.

In the technical solution of these implementations, under the condition that the first function control command includes a hardware trigger mode setting command and/or a software trigger mode setting command, the debugging method provided in the embodiments of this application provides a function of setting different trigger modes for the target image acquisition device so as to further inspect whether the target image acquisition device runs properly under different trigger modes, such that the target image acquisition device can meet diverse actual needs.

In some possible implementations, the first function control command further includes an acquisition parameter setting command, and the acquisition parameter setting command includes an acquisition parameter; and before the calling, according to a trigger command for a target image acquisition device, a control program for the target image acquisition device so as to trigger the target image acquisition device to acquire an image, the debugging method further includes: calling the control program for the target image acquisition device according to an acquisition parameter setting command for the target image acquisition device so as to set an acquisition parameter of the target image acquisition device.

The technical solution of these implementations provides a method for setting an acquisition parameter of a target image acquisition device, such that the acquisition parameter of the target image acquisition device can be flexibly adjusted, which facilitates more comprehensive debugging of the target image acquisition device in a debugging stage and improves the debugging effect.

In some possible implementations, the acquisition parameter includes a gain parameter and/or exposure time.

Adjusting the gain parameter and/or exposure time of the target image acquisition device can effectively and reliably improve the image acquisition of the target image acquisition device.

In some possible implementations, the first function control command further includes an image acquisition start command and/or a trigger mode enable command; and before the calling, according to a trigger command for a target image acquisition device, a control program for the target image acquisition device so as to trigger the target image acquisition device to acquire an image, the debugging method further includes: calling the control program for the target image acquisition device according to an image acquisition start command for the target image acquisition device so as to control the target image acquisition device to start an image acquisition function; and/or calling the control program for the target image acquisition device according to a trigger mode enable command for the target image acquisition device so as to control the target image acquisition device to start a trigger mode function.

The technical solution of these implementations not only provides a function of debugging the triggering of the target image acquisition device, but also provides a function of debugging the image acquisition start and/or trigger mode enabling of the target image acquisition device, which is conducive to further improving debugging comprehensiveness of the target image acquisition device, improving the debugging effect.

In some possible implementations, after the calling, according to a trigger command for a target image acquisition device, a control program for the target image acquisition device so as to trigger the target image acquisition device to acquire an image, the debugging method further includes: receiving an algorithm inspection command for the image; and calling, according to the algorithm inspection command, an algorithm program to examine the image so as to determine whether quality of the image meets a preset condition.

In the technical solution of these implementations, after the debugging apparatus triggers the target image acquisition device to acquire an image, the debugging apparatus can further perform algorithm inspection on the image acquired by the target image acquisition device, such that the image acquired by the target image acquisition device can meet actual needs.

In some possible implementations, under the condition that the quality of the image does not meet the preset condition, the debugging method further includes: receiving an acquisition parameter setting command for the target image acquisition device; and calling the control program for the target image acquisition device according to the acquisition parameter setting command for the target image acquisition device so as to set the acquisition parameter of the target image acquisition device.

In the technical solution of these implementations, under the condition that the quality of the image does not meet the preset condition, the debugging apparatus may further adjust the acquisition parameter of the target image acquisition device, such that the quality of the image acquired by the target image acquisition device can meet the algorithm requirements, thereby improving the debugging effect of the target image acquisition device.

In some possible implementations, the plurality of first devices include a plurality of light source control devices, where each of the light source control devices is connected to at least one light source, and the first function control command includes a light source on command and/or a light source off command; where the calling the control programs for the plurality of first devices according to the first function control commands for the plurality of first devices respectively so as to execute a first function on each of the plurality of first devices includes: calling, according to a light source on command for a target light source control device in the plurality of light source control devices, a control program for the target light source control device so as to control a light source corresponding to the target light source control device to turn on; and/or calling, according to a light source off command for a target light source control device in the plurality of light source control devices, the control program for the target light source control device so as to control the light source corresponding to the target light source control device to turn off.

The technical solution of these implementations provides a function of debugging a light source connected to the target light source control device in the plurality of light source control devices, facilitating the ability to inspect whether the target light source control device and the light source connected to the target light source control device are functioning properly, and allowing convenient control of the turn-on and turn-off of the light source according to actual needs.

In some possible implementations, the first function control command further includes a light source parameter setting command, and the light source parameter setting command includes a light source parameter; and after the calling, according to a light source on command for a target light source control device, a control program for the target light source control device so as to control a light source corresponding to the target light source control device to turn on, the debugging method further includes: calling, according to a light source parameter setting command for the target light source control device, the control program for the target light source control device so as to control the light source corresponding to the target light source control device to turn on with the light source parameter.

On the basis of turning on the light source corresponding to the target light source control device, the technical solution of these implementations further provides a debugging method for the light source parameter of the light source corresponding to the target light source control device, thereby further improving the comprehensiveness of debugging, such that the light source corresponding to the target light source control device has a better luminous effect and can meet different requirements in different environments.

In some possible implementations, the plurality of first devices include a plurality of production line control devices, and the first function control command includes a read command and/or a write command; where the calling the control programs for the plurality of first devices according to the first function control commands for the plurality of first devices respectively so as to execute a first function on each of the plurality of first devices includes: calling, according to a read command for a target production line control device in the plurality of production line control devices, a control program for the target production line control device so as to read a configuration parameter from the target production line control device; and/or calling, according to a write command for a target production line control device in the plurality of production line control devices, the control program for the target production line control device so as to write a configuration parameter to the target production line control device.

The technical solution of these implementations provides a debugging function for the target production line control device, such that a user can read a configuration parameter of the target production line control device to understand the operation of the production line control device, and/or a user can also write a configuration parameter to the target production line control device to adjust the operation of the target production line control device, thereby improving the overall debugging function and enabling the target production line control device to meet various actual needs.

In some possible implementations, the read command includes at least one of the following information of a to-be-read configuration parameter: data type, data address, and data length; and/or the write command includes at least one of the following information of a to-be-written configuration parameter: data type, data address, and data length.

In the technical solution of these implementations, at least one piece of information of the configuration parameter of the target production line control device can be read and/or written via a read command and/or write command, which improves the debugging flexibility and debugging performance of the target production line control device.

In some possible implementations, the receiving control commands for a plurality of first devices in a production line includes: displaying a debugging screen, where the debugging screen includes a plurality of tags corresponding to the plurality of first devices; and receiving control commands for the plurality of tags from a user; and the calling the control programs for the plurality of first devices according to the control commands for the plurality of first devices respectively so as to debug the plurality of first devices includes: calling, according to the control commands for the plurality of tags, the control programs for the plurality of first devices corresponding to the plurality of tags so as to debug the plurality of first devices.

In the technical solution of these implementations, the debugging screen includes a plurality of tags corresponding to the plurality of first devices, and a user can select a plurality of tags and perform operations on the plurality of tags, thereby generating control commands for the plurality of tags, which can optimize the experience of the user in debugging the plurality of first devices in the production line.

In some possible implementations, the debugging screen further includes a first function operation area corresponding to the plurality of tags; and the receiving control commands for the plurality of tags from a user includes: receiving control commands for the first function operation area corresponding to the plurality of tags from the user.

In the technical solution of this implementation, the debugging screen can provide the user with one same first function operation area corresponding to the plurality of first devices, and by selecting tabs corresponding to different first devices and performing operation on that same first function operation area, the user can control different first devices to perform the first function, thereby simplifying the overall design of the debugging screen and further improving the experience of the user in debugging the plurality of first devices.

In some possible implementations, the debugging method further includes: receiving control commands for a plurality of second devices in the production line, where respective control programs are configured for the plurality of second devices, and the second devices function differently than the first devices; and calling the control programs for the plurality of second devices according to the control commands for the plurality of second devices respectively so as to debug the plurality of second devices.

In the technical solution of these implementations, not only a plurality of first devices but also a plurality of second devices can be debugged so as to implement a multi-purpose debugging method, thereby improving the experience of the user in debugging the plurality of first devices and the plurality of second device.

In some possible implementations, the first device and the second device are any two of the following devices respectively: an image acquisition device, a light source control device, and a production line control device.

In some possible implementations, the receiving control commands for a plurality of first devices in a production line includes: displaying a first sub-screen of the debugging screen, where the first sub-screen includes a plurality of first tags corresponding to the plurality of first devices; and receiving control commands for the plurality of first tags from a user; and the receiving control commands for a plurality of second devices in the production line includes: displaying a second sub-screen of the debugging screen, where the second sub-screen includes a plurality of second tags corresponding to the plurality of second devices; and receiving control commands for the plurality of second tags from a user.

In the technical solution of these implementations, the debugging apparatus can provide the user with debugging sub-screens for various types of devices, facilitating the debugging of various types of devices by using one same debugging apparatus, thereby further improving the debugging experience of the user.

In some possible implementations, the debugging method is applied to a battery production line.

The technical solution of these implementations can optimize the performance of production line devices in the battery production line, which is conducive to improving the production efficiency and product yield of the battery production line.

According to a second aspect, a debugging apparatus for production line devices is provided, including a first interface module, where the first interface module is configured to receive control commands for a plurality of first devices in a production line, where respective control programs are configured for the plurality of first devices; and call the control programs for the plurality of first devices according to the control commands for the plurality of first devices respectively so as to debug the plurality of first devices.

According to a third aspect, a debugging apparatus for production line devices is provided, including a processor and a memory, where the memory is configured to store a program, and the processor is configured to call and run the program to execute the debugging method according to any one of the first aspect and the possible implementations of the first aspect.

According to a fourth aspect, a production line system is provided, including production line devices and the debugging apparatus according to the second aspect or the third aspect, where the debugging apparatus is configured to debug the production line devices.

In some possible implementations, the production line system is a battery production line system.

In the technical solution of the embodiments of this application, the execution subject (for example, debugging apparatus) of the debugging method can receive control commands for a plurality of first devices from an upper layer (for example, user), and call, according to the control commands, control programs corresponding to the plurality of first devices to control the plurality of first devices so as to debug the plurality of first devices. This debugging solution enables the plurality of first devices to meet requirements of different environments and can locate possible problems of the plurality of first devices, thereby improving the performance of the production line to which the plurality of first devices belong. In addition, in this technical solution, the execution subject of the debugging method can provide a unified interface for the upper layer (for example, user) to control the plurality of first devices, and the execution subject can screen the upper layer from specific control of a lower layer for the plurality of first devices, so the upper layer does not need to perform different operations on the first devices of different models or from different manufac- turers, but only needs to use the control commands to implement control on the first devices of different models or from different manufacturers. In this way, the debugging for the plurality of first devices becomes simple and unified, and the experience of the upper layer (for example, user) in debugging a plurality of first devices can be optimized.

BRIEF DESCRIPTION OF DRAWINGS

To describe the technical solutions in the embodiments of this application more clearly, the following briefly describes the accompanying drawings required for describing the embodiments of this application. Apparently, the accompanying drawings described below show merely some embodiments of this application, and persons of ordinary skill in the art may still derive other drawings from the accompanying drawings without creative efforts.

FIG. 8 is a schematic flowchart of another debugging method for production line devices according to an embodiment of this application;

FIG. 15 is a schematic diagram of a PLC debugging screen according to an embodiment of this application;

Figure 1:
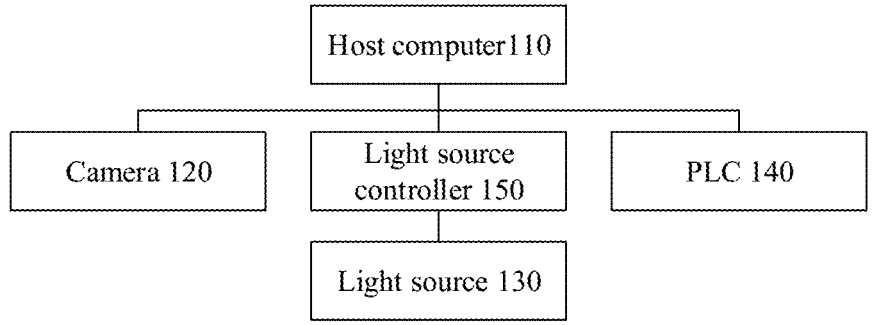
FIG. 1 is a diagram of a system architecture of a production line system to which an embodiment of this application is applied.

The accompanying drawings are not drawn to scale.

DESCRIPTION OF EMBODIMENTS

The following further describes implementations of this application in detail with reference to accompanying drawings and embodiments. The following detailed description of embodiments and the accompanying drawings are used to illustrate the principle of this application, but cannot be used to limit the scope of this application, meaning this application is not limited to the described embodiments.

In the descriptions of this application, it should be understood that, unless otherwise specified, "a plurality of" means at least two; orientations or positional relationships indicated by the terms "up", "down", "left", "right", "inside", "outside", and the like are intended only for the ease and brevity of description of this application, rather than indicating or implying that an apparatus or element must have a particular direction or must be constructed and operated in a particular orientation. Therefore, they shall not be construed as any limitation on this application.

The term "and/or" in this application is only an associative relationship for describing associated objects, indicating that three relationships may be present. For example, A and/or B may indicate three cases: presence of A; presence of both A and B; and presence of B. In addition, the character "/" in this application generally indicates an "or" relationship between contextually associated objects.

Unless otherwise defined, all technical and scientific terms used in this application shall have the same meanings as commonly understood by those skilled in the art to which this application relates. The terms used in the specification of this application are intended to merely describe the specific embodiments rather than to limit this application. The terms "include", "comprise", and any variations thereof in the specification and claims of this application as well as the foregoing description of drawings are intended to cover non-exclusive inclusions. In the specification, claims, or accompanying drawings of this application, the terms "first", "second", "third", and the like are intended to distinguish between different objects rather than to indicate a particular order or relative importance.

Reference to "embodiment" in this application means that specific features, structures, or characteristics described with reference to the embodiment may be included in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

This application relates to a debugging method and apparatus for production line devices and a production line system. The production line may specifically refer to an automated production line. The automated production line is a production line where machines are connected according to production processes so that the production line includes processes such as feeding, discharging, loading and unloading, and product processing, and is capable of automated control, automated measurement, and automated continuity.

To make the production and manufacturing of products on the production line proceed in an orderly manner, a plurality of inspection devices can be configured in the production line to monitor the manufacturing process of products. As an example rather than a limitation, the plurality of inspection devices may include visual inspection devices, meaning that the production line may use visual inspection technology to realize rapid measurement of various characteristic parameters such as three-dimensional size, position, and appearance of objects. Specifically, the visual inspection devices may include an image acquisition device (for example, camera) configured to acquire images of products or parts on the production line. Further, the visual inspection devices may also include a light source configured to supplement ambient light intensity of the production line so as to improve quality of the images acquired by the image acquisition device.

If no adjustments are made to the visual inspection devices, the visual inspection devices can provide only the same visual solution. However, the same visual solution cannot adapt to different production line environments, resulting in a reduction in their capabilities to inspect products.

In some related technical solutions, in order to adapt the visual inspection devices to different environments and improve the quality of the images acquired, the production line system is equipped with a debugging apparatus for adjusting the visual inspection devices. However, there may be many types of visual inspection devices, and even the same type of devices may come from different manufacturers or have different models. Therefore, different types of visual inspection devices need to be debugged via different software. Such debugging solution is inefficient, not conducive to the rapid deployment of devices from different manufacturers or of different types in the production line, and not conducive to the fast location of problems of the devices in the production line.

In view of this, this application provides a debugging method for production line devices. The debugging method includes: receiving control commands for a plurality of first devices in a production line, where respective control programs are configured for the plurality of first devices; and calling the control programs for the plurality of first devices according to the control commands for the plurality of first devices respectively so as to debug the plurality of first devices. With this debugging method, users or other upper-layer control apparatuses can perform real-time control and debugging for the plurality of first devices in the production line, such that the plurality of first devices can adapt to different production line environments, improving overall performance of the plurality of first devices and the production line to which they belong. In addition, the execution subject of the debugging method may be a debugging apparatus of the production line device. As a middle layer, the debugging apparatus can be used as an interface for an upper layer (for example, user) to control and debug the plurality of first devices. The debugging apparatus can screen the upper layer from specific control of a lower layer, so the upper layer does not need to perform different operations on the plurality of first devices of different models or from different manufacturers, but only needs to send the control commands to the debugging apparatus to implement control on the first devices of different models or from different manufacturers. In this way, the debugging for the first devices becomes simple and unified, and the experience of the upper layer (for example, user) in debugging first devices can be optimized.

FIG. 1 is a diagram of a system architecture of a production line system 100 to which an embodiment of this application is applied.

As shown in FIG. 1, the production line system 100 may include a host computer 110, a camera 120, a light source 130, and a programmable logic controller (programmable logic controller, PLC) 140.

As shown in FIG. 1, the host computer 110 may be connected to the camera 120, the light source 130, and the PLC 140. The host computer 110 may be configured with control programs for controlling the camera 120, the light source 130, and the PLC 140. Optionally, the control program can provide on the host computer 110 an interface for interacting with a user, and the user can control the camera 120, the light source 130, and the PLC 140 by operating that interface.

Optionally, in some implementations, the light source 130 may be directly connected to the host computer 110, or in some other implementations, the production line system 100 may further include a light source controller 150, and the light source 130 may alternatively be connected to the host computer 110 via the light source controller 150.

Specifically, in the production line system 100, the camera 120 and the light source 130 each may be provided in plurality, and the plurality of cameras 120 and the plurality of light sources 130 may be distributed and arranged at different positions of the production line to acquire images of products at different positions of the production line. Optionally, the cameras 120 may include a line scan camera (or a single-scan line camera), an area scan camera, a monochrome camera, a color camera, and many other types of industrial cameras. The light sources 130 may include various light sources of light emitting diode (light emitting diode, LED) or other types. Embodiments of this application impose no limitation on specific types of the cameras 120 and the light sources 130.

The PLC 140 may be configured for automated control of various mechanical components in the production line system 100, able to acquire relevant signals from different nodes in the production line system 100 and implement different control on different nodes in the production line system 100 according to the signals and user control so as to ensure normal production and operation of the production line system 100.

It can be understood that FIG. 1 only schematically shows some devices in the production line system 100. In addition to the host computer 110, camera 120, light source 130, and PLC 140 shown in FIG. 1, the production line system 100 may further include other components in related art. Embodiments of this application impose no limitation on the specific architecture of the production line system 100.

Moreover, the cameras 120 and light sources 130 may be some of the visual inspection devices in the production line system 100. In addition to the cameras 120 and the light sources 130, the production line system 100 may further include other visual inspection devices, for example, lens, image acquisition cards, and image processing software.

As an example rather than a limitation, the production line system 100 shown in FIG. 1 may be a battery production line system. The images acquired via cooperation between the cameras 120 and the light sources 130 can be used for the inspection of battery products produced in the battery production line system, for example, for detection of foreign objects, scratches, indentations, tab defects, contamination, corrosion, pits, tab burns, poor coding, blurred characters, and the like on the battery products.

Alternatively, in other embodiments, the production line system 100 shown in FIG. 1 may alternatively be a production line system for other types of products. For example, the production line system 100 may be a mechanical parts processing production line, a circuit board production line, an electronic component production line, and the like.

Figure 2:
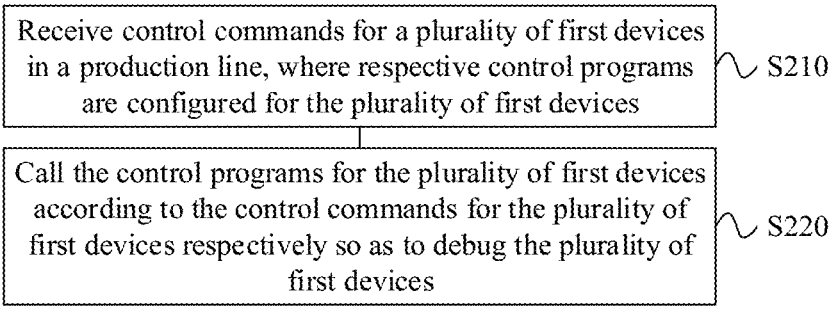
FIG. 2 is a schematic flowchart of a debugging method for production line devices according to an embodiment of this application.

FIG. 2 is a schematic flowchart of a debugging method 200 for production line devices according to an embodiment of this application.

As shown in FIG. 2, the debugging method 200 for production line devices includes the following steps.

S210: Receive control commands for a plurality of first devices in a production line, where respective control programs are configured for the plurality of first devices.

S220: Call the control programs for the plurality of first devices according to the control commands for the plurality of first devices respectively so as to debug the plurality of first devices.

Optionally, in an embodiment of this application, the debugging method 200 for production line devices may be executed by a debugging apparatus, where the debugging apparatus may be used as an interface for an upper layer (for example, user) to control the plurality of first devices in the production line. Optionally, the debugging apparatus may include debugging software, and the debugging software may be installed on the host computer 110 shown in FIG. 1 as described above.

In step S210, the debugging apparatus may receive the control commands for the plurality of first devices from a user. In some implementations, the host computer 110 has a display, and the debugging apparatus can display a debugging screen on the display of the host computer 110, where the debugging screen includes tab options corresponding to the plurality of first devices. The user manipulates a plurality of tab options in the debugging screen, thus inputting control commands for a plurality of first devices to the host computer 110, such that the debugging apparatus on the host computer 110 receives the control commands corresponding to the plurality of first devices.

Optionally, the first device may be any device in the production line. The plurality of first devices are devices having the same function. As an example rather than a limitation, the first device may be a visual inspection device. For example, the first device may be the camera 120, the light source 130, or the light source controller 150 shown in FIG. 1 as described above. Alternatively, the first device may alternatively be a mechanical device or a control device. For example, the first device may alternatively be the PLC 140 shown in FIG. 1 as described above.

Optionally, at least some of the plurality of first devices may be devices from different manufacturers and/or of different models. For the different manufacturers and/or of different models, respective control programs are configured for the plurality of first devices. The control program may include at least one of the following code programs corresponding to the first device: driver program, protocol program, and software development kit (software development kit, SDK) program. For first devices from different manufacturers and/or of different models, the control programs configured may also have some differences. The user can control a corresponding hardware production line device to perform a corresponding operation, only by using a corresponding control program.

In step S220, the debugging apparatus may call the control programs for the plurality of first devices according to the control commands for the plurality of first devices respectively.

Optionally, the debugging apparatus may include an encapsulated interface. The interface may be configured to receive the control commands for the plurality of first devices, and may call, according to relevant information in the control commands, the control programs corresponding to the plurality of first devices so as to control and debug the plurality of first devices.

Optionally, in software code of the debugging apparatus, the interface may specifically be an interface function. The control programs corresponding to the plurality of first devices may be integrated into the software code of the debugging apparatus, and the control programs are located at a lower layer of the interface function. The interface function may acquire the control commands for the plurality of first devices, and then call the control programs at its lower layer, such that the control programs implement control and debugging for the plurality of first devices.

To sum up, in the technical solution of the embodiments of this application, an execution subject (for example, debugging apparatus) of the debugging method 200 can receive control commands for a plurality of first devices from the upper layer (for example, user), and call, according to the control commands, control programs corresponding to the plurality of first devices to control the plurality of first devices so as to debug the plurality of first devices. This technical solution enables the plurality of first devices to meet requirements of different environments and can locate possible problems of the plurality of first devices, thereby improving the performance of the production line to which the plurality of first devices belong.

In addition, in this technical solution, the execution subject of the debugging method 200 can provide a unified interface for the upper layer (for example, user) to control the plurality of first devices, and the execution subject can screen the upper layer from specific control of a lower layer for the plurality of first devices, so the upper layer does not need to perform different operations on first devices of different models or from different manufacturers, but only needs to use the control commands to implement control on the first devices of different models or from different manufacturers. In this way, the debugging for the plurality of first devices becomes simple and unified, and the experience of the upper layer (for example, user) in debugging a plurality of first devices can be optimized.

Figure 3:
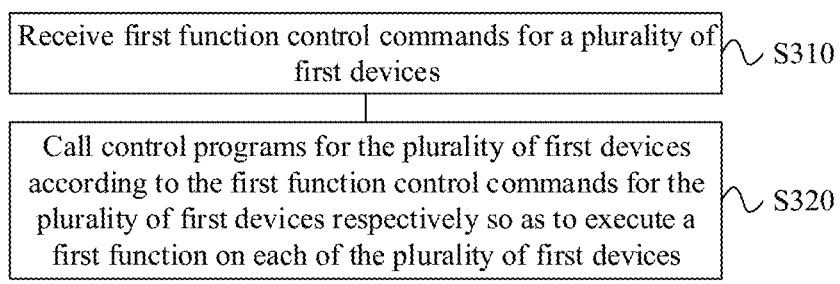
FIG. 3 is a schematic flowchart of another debugging method for production line devices according to an embodiment of this application.

FIG. 3 is a schematic flowchart of another debugging method 300 for production line devices according to an embodiment of this application.

As shown in FIG. 3, the debugging method 300 for production line devices includes the following steps.

S310: Receive first function control commands for a plurality of first devices.

S320: Call control programs for the plurality of first devices according to the first function control commands for the plurality of first devices respectively so as to execute a first function on each of the plurality of first devices.

Optionally, in an embodiment of this application, the foregoing step S310 may be an implementation of step S210 in FIG. 2 as described above, and step S320 may be an implementation of step S220.

Optionally, the foregoing steps S310 and S320 may be executed by the debugging apparatus in the foregoing embodiment, and the debugging apparatus includes a first function interface, where the first function interface can call the control programs for the plurality of first devices according to the first function control commands for the plurality of first devices respectively so as to execute the first function on each of the plurality of first devices. Optionally, the first function interface may be a function interface function.

Optionally, in this embodiment of this application, the first function control command may include a plurality of types of function control commands, and the function control commands may be correspondingly set according to specific types of the first devices and actual requirements. For example, under the condition that the first device is a camera, the first function control command may be a trigger command used for triggering the camera to perform image acquisition, or under the condition that the first device is a light source, the first function control command may be an on command used for turning on the light source. Embodiments of this application impose no limitation on the specific content of the first function control commands.

In order to correspond to various types of function control commands for the first devices, in this implementation, the debugging apparatus may include a plurality of function interfaces, where each of the function interfaces corresponds to one function, meaning that each of the function interfaces is configured to receive one type of function control command.

In the technical solution of this application, the control commands for the plurality of first devices can include the first function control commands, and the debugging apparatus can receive the first function control commands for the plurality of first devices through a same interface, and debug the plurality of first devices according to the first function control commands for the plurality of first devices to inspect whether the plurality of first devices can perform the first function properly, thus providing debugging specific to the plurality of first devices, improving the debugging effect and the overall performance of the production line.

Optionally, the plurality of first devices include a first target device, and the first function control command includes a connect command and/or a disconnect command. The first target device may be any one of the plurality of first devices. The connect command is used to instruct the plurality of first devices to connect to the debugging apparatus, and the disconnect command is used to instruct the plurality of first devices to disconnect from the debugging apparatus.

Figure 4:
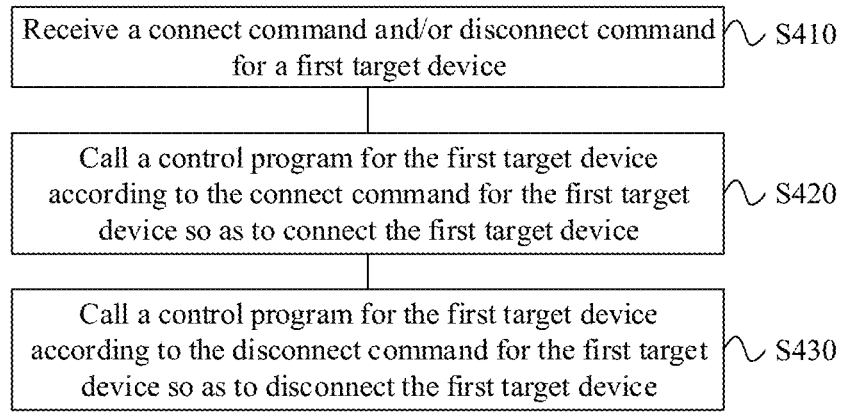
FIG. 4 is a schematic flowchart of another debugging method for production line devices according to an embodiment of this application.

For this case, FIG. 4 is a schematic flowchart of a debugging method 400 for production line devices according to an embodiment of this application.

As shown in FIG. 4, the debugging method 400 for production line devices includes the following steps.

S410: Receive a connect command and/or disconnect command for a first target device.

S420: Call a control program for the first target device according to the connect command for the first target device so as to connect the first target device; and/or S430: Call the control program for the first target device according to the disconnect command for the first target device so as to disconnect the first target device.

Optionally, the foregoing step S410 may be an implementation of step S310 in the embodiment shown in FIG. 3 as described above, and step S420 and step S430 may be two implementations of step S320. Step S410 to step S430 in this embodiment of this application may also be executed by the debugging apparatus in the foregoing embodiments.

Optionally, in an embodiment of this application, the debugging apparatus may include a connect function interface, where the connect function interface may be configured to receive connect commands for the plurality of first devices. After receiving a connect command for the first target device, the connect function interface may call the control program for the first target device to control the first target device to connect to the debugging apparatus.

Similarly, interfaces of the debugging apparatus may include a disconnect function interface, where the disconnect function interface may be configured to receive disconnect commands for the plurality of first devices. After receiving a disconnect command for the first target device, the disconnect function interface may call the control program for the first target device to control the first target device to disconnect from the debugging apparatus.

The technical solution of these implementations of this application provides a connect function and/or disconnect function for debugging the first target device in the plurality of first devices, which can ensure normal communication between the first target device and the debugging apparatus and can reflect whether the first target device is running properly so as to ensure the debugging effect and help accurately locate relevant problems of the first target device.

In some implementations, the plurality of first devices may include a plurality of image acquisition devices, such as cameras. The first function control command includes a trigger command, where the trigger command may be used to trigger the image acquisition device to start image acquisition. In this case, FIG. 5 is a schematic flowchart of another debugging method 500 for production line devices according to an embodiment of this application.

Figure 5:
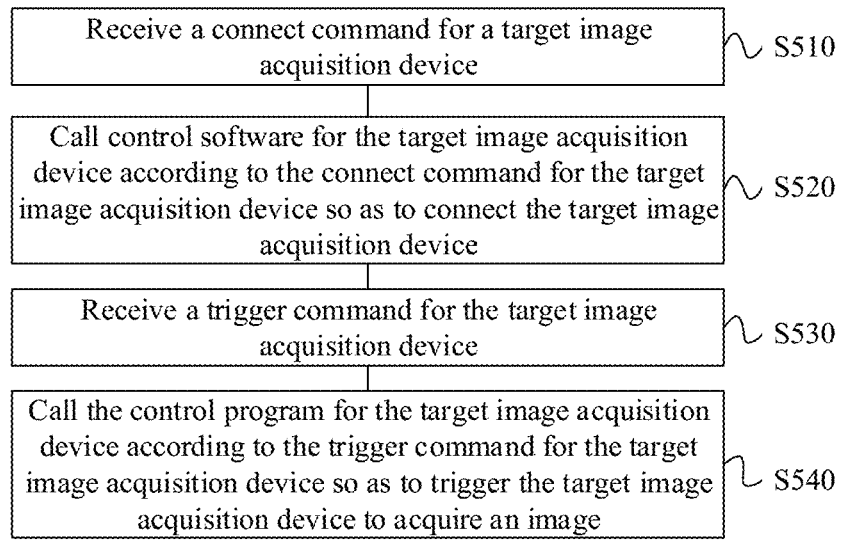
FIG. 5 is a schematic flowchart of another debugging method for production line devices according to an embodiment of this application.

As shown in FIG. 5, the debugging method 500 for production line devices includes the following steps.

S530: Receive a trigger command for a target image acquisition device.

S540: Call the control program for the target image acquisition device according to the trigger command for the target image acquisition device so as to trigger the target image acquisition device to acquire an image.

Optionally, the foregoing step S530 may be an implementation of step S310 in the embodiment shown in FIG. 3 as described above, and step S540 may be an implementation of step S320. The debugging method 500 in this embodiment of this application may also be executed by the debugging apparatus in the foregoing embodiments.

Optionally, in an embodiment of this application, the first function control command may include a trigger command. Correspondingly, the debugging apparatus may include a trigger function interface, where the trigger function interface may be configured to receive trigger commands for the plurality of image acquisition devices, and call the control programs for the plurality of image acquisition devices respectively according to the trigger commands for the plurality of image acquisition devices, to respectively trigger the plurality of image acquisition devices to acquire images.

Specifically, the target image acquisition device may be any one of the plurality of image acquisition devices. After receiving the trigger command for the target image acquisition device, the trigger function interface calls the control program for the target image acquisition device so as to trigger the target image acquisition device to acquire an image.

Optionally, the first function control command may further include a hardware trigger mode setting command and/or a software trigger mode setting command. The two trigger mode setting commands may be used to indicate two trigger modes of the image acquisition devices.

Specifically, in a hardware trigger mode, a trigger signal for an image acquisition device may be provided by hardware. For example, a hardware component such as a relay provides the trigger signal for the image acquisition device such that the image acquisition device acquires an image in the hardware trigger mode. Correspondingly, in a software trigger mode, a trigger signal for an image acquisition device may be provided by software. For example, the trigger signal may be provided by a control program for the image acquisition device such that the image acquisition device acquires an image in the software trigger mode.

Before the foregoing step S540, the debugging method 500 further includes: calling the control program for the target image acquisition device according to a hardware trigger mode setting command for the target image acquisition device so as to set a trigger mode of the target image acquisition device to a hardware trigger mode; and/or calling the control program for the target image acquisition device according to a software trigger mode setting command for the target image acquisition device so as to set a trigger mode of the target image acquisition device to a software trigger mode.

Optionally, the debugging apparatus may include a trigger mode setting function interface, such as a software trigger mode setting function interface and/or a hardware trigger mode setting function interface. After the trigger mode setting function interface sets the trigger mode of the target image acquisition device, the trigger function interface in the debugging apparatus may be configured to receive the trigger command for the target image acquisition device to control the target image acquisition device to acquire an image in a specified trigger mode.

The technical solution of this implementation provides debugging of the function of triggering the target image acquisition device in the plurality of image acquisition devices, facilitating the ability to inspect whether the target image acquisition device is normally triggered and allowing convenient control of the triggering of the target image acquisition device according to actual needs.

In addition, under the condition that the first function control command includes a hardware trigger mode setting command and/or a software trigger mode setting command, the debugging method provided in the embodiments of this application provides a function of setting different trigger modes for the target image acquisition device so as to further inspect whether the target image acquisition device runs properly under different trigger modes, such that the target image acquisition device can meet diverse actual needs.

Optionally, as shown in FIG. 5, before step S530, this embodiment of this application may further include the following steps S510 and S520.

S510: Receive a connect command for the target image acquisition device.

S520: Call control software for the target image acquisition device according to the connect command for the target image acquisition device so as to connect the target image acquisition device.

In this embodiment, the debugging apparatus may first implement a connection to the target image acquisition device, and under the condition that the connection is successful, the debugging apparatus acquires the trigger command for the target image acquisition device, and triggers the target image acquisition device to acquire an image according to the trigger command.

Optionally, under the condition that the connection fails, the debugging apparatus may send an alert message to a user to alert the user of the connection failure, such that the user can locate the problem of the target image acquisition device that has failed to connect.

Figure 6:
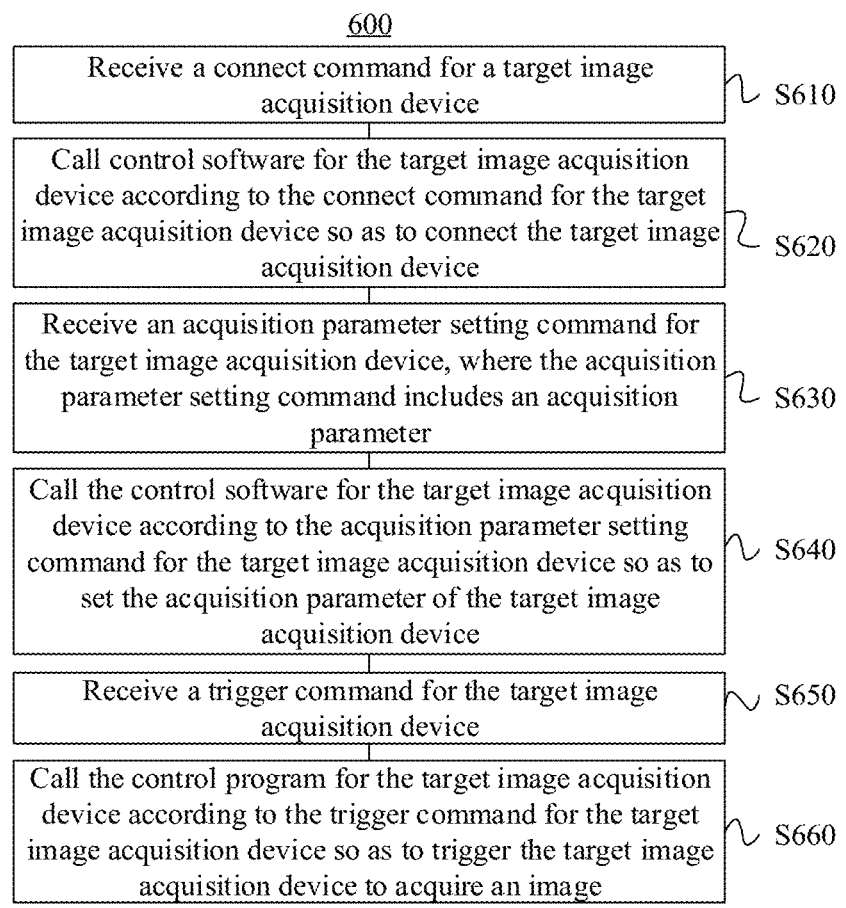
FIG. 6 is a schematic flowchart of another debugging method for production line devices according to an embodiment of this application.

On the basis of the embodiment shown in FIG. 5, FIG. 6 is a schematic flowchart of another debugging method 600 for production line devices according to an embodiment of this application.

As shown in FIG. 6, the debugging method 600 for production line devices includes the following steps.

S610: Receive a connect command for the target image acquisition device.

S620: Call control software for the target image acquisition device according to the connect command for the target image acquisition device so as to connect the target image acquisition device.

S630: Receive an acquisition parameter setting command for the target image acquisition device, where the acquisition parameter setting command includes an acquisition parameter.

S640: Call the control software for the target image acquisition device according to the acquisition parameter setting command for the target image acquisition device so as to set the acquisition parameter of the target image acquisition device.

S650: Receive a trigger command for the target image acquisition device.

S660: Call the control program for the target image acquisition device according to the trigger command for the target image acquisition device so as to trigger the target image acquisition device to acquire an image.

Optionally, the foregoing steps S610, S630, and S650 may be several implementations of step S310 in the embodiment shown in FIG. 3 as described above, and steps S620, S640, and S660 may be several implementations of step S320. The debugging method 600 in this embodiment of this application may also be executed by the debugging apparatus in the foregoing embodiments.

Specifically, for specific solutions of steps S610, S620, S650, and S660, reference may be made to the relevant descriptions of the embodiment shown in FIG. 5 as described above, and details are not repeated herein.

In an embodiment of this application, the first function control command may further include an acquisition parameter setting command. This means that the debugging apparatus may receive acquisition parameter setting commands for the plurality of image acquisition devices. The acquisition parameters in the acquisition parameter setting command may be related parameters required by the image acquisition device for acquiring an image. As an example rather than a limitation, the acquisition parameters may include various types of parameters such as gain, exposure time, and acquisition mode of the image acquisition device.

Optionally, the debugging apparatus may include an acquisition parameter setting function interface, where the acquisition parameter setting function interface may be configured to receive acquisition parameter setting commands for the plurality of image acquisition devices. After receiving an acquisition parameter setting command for a target image acquisition device, the acquisition parameter setting function interface may call a control program for the target image acquisition device according to the acquisition parameter setting command so as to set the acquisition parameter of the target image acquisition device.

In this implementation, after the debugging apparatus receives the trigger command for the target image acquisition device, the debugging apparatus can call the control program for the target image acquisition device according to the trigger command for the target image acquisition device so as to trigger the target image acquisition device to use the acquisition parameter set to perform image acquisition.

The technical solution of this implementation provides a method for setting an acquisition parameter of a target image acquisition device, such that the acquisition parameter of the target image acquisition device can be flexibly adjusted, which facilitates more comprehensive debugging of the target image acquisition device in a debugging stage and improves the debugging effect.

Optionally, in some embodiments, in addition to receiving an acquisition parameter setting command for the target image acquisition device so as to set the acquisition parameter of the target image acquisition device, the debugging apparatus may also acquire a current acquisition parameter of the target image acquisition device, such that a user sets a new acquisition parameter according to the current acquisition parameter, where the acquisition parameter setting command received by the debugging apparatus may include the new acquisition parameter so as to replace the original acquisition parameter.

Specifically, before the foregoing step S630, the debugging method 600 may further include: calling the control program for the target image acquisition device to acquire the current acquisition parameter of the target image acquisition device. In this case, in step S640, the process of setting acquisition parameters of a plurality of image acquisition devices by the debugging apparatus can be understood as a process of modifying the current acquisition parameters of the plurality of image acquisition devices.

Optionally, the debugging apparatus may include a parameter acquisition function interface, where the parameter acquisition interface may call the control program for the target image acquisition device to acquire the current acquisition parameter of the target image acquisition device.

Optionally, in some possible implementations, before the foregoing step S650, the debugging method 600 may further include: receiving an image acquisition start command and/or a trigger mode enable command for the target image acquisition device; calling the control program for the target image acquisition device according to the image acquisition start command for the target image acquisition device to control the target image acquisition device to start an image acquisition function; and/or calling the control program for the target image acquisition device according to the trigger mode enable command for the target image acquisition device to control the target image acquisition device to start a trigger mode function.

Specifically, in these implementations, the first function control commands for the plurality of image acquisition devices may include image acquisition start commands, where the image acquisition start commands may be used to instruct the plurality of image acquisition devices to start the image acquisition function.

Optionally, interfaces of the debugging apparatus may include an image acquisition function interface, and the image acquisition function interface is configured to receive the image acquisition start commands for the plurality of image acquisition devices. Specifically, after receiving the image acquisition command for the target image acquisition device, the image acquisition function interface may call the control program for the target image acquisition device according to the image acquisition start command for the target image acquisition device so as to control the target image acquisition device to start the image acquisition function.

In addition, the first function control commands for the plurality of image acquisition devices may further include trigger mode enable commands, where the trigger mode enable commands may be used to instruct the plurality of image acquisition devices to enable a trigger mode.

Optionally, interfaces of the debugging apparatus may include a trigger mode enable function interface, and the trigger mode enable function interface is configured to receive trigger mode enable commands for the plurality of image acquisition devices. Specifically, after receiving the trigger mode enable for the target image device, the trigger mode enable function interface may call the control program for the target image acquisition device to control the target image acquisition device to start a trigger mode function.

After the target image acquisition device starts the image acquisition function and/or the trigger mode function, the debugging apparatus may trigger, according to the trigger command received, the target image acquisition device to acquire an image.

The technical solution of these implementations not only provides a function of debugging the triggering of the target image acquisition device, but also provides a function of debugging the image acquisition start and/or trigger mode enabling of the target image acquisition device, which is conducive to further improving debugging comprehensiveness of the target image acquisition device, improving the debugging effect.

It can be understood that, corresponding to the above-mentioned image acquisition start command and/or trigger mode enable command, the debugging apparatus may also receive image acquisition stop commands and/or trigger mode disable commands for the plurality of image acquisition devices. According to the image acquisition stop commands and/or trigger mode disable commands for the plurality of image acquisition devices, the debugging apparatus may call the control programs for the plurality of image acquisition devices respectively so as to control the plurality of image acquisition devices respectively to stop the image acquisition function and/or disable the trigger mode function.

For ease of understanding, the following shows various function interfaces used for the image acquisition devices in the debugging apparatus provided in the embodiments of this application, and the function interfaces may specifically be interface functions.

virtual bool open( )=0; //open the camera
virtual void close( )=0; //close the camera
virtual void startGrab( )=0; //start image acquisition
virtual void stopGrab( )=0; //stop image acquisition
virtual bool isConnected( )=0; //check the connection state
virtual bool settriggerModeOn( )=0; //enable the trigger mode
virtual bool settriggerModeOff( )=0; //disable the trigger mode
virtual bool setSoftwareTriggerSource( )=0; //set the software trigger mode
virtual bool setHandwareTriggerSource( )=; //set the hardware trigger mode
virtual bool softwareExecute (String mark="null")=0; //execute software triggering once virtual float getExposureTime( )=0; //get the exposure time of the camera
virtual bool setExposureTime (const float value)=0; //set the exposure time of the camera
virtual bool setAcquisitionMode( )=0; //set the acquisition mode
virtual bool setGainValue (const float value)=0; //set the gain value It can be known from the preceding code that the debugging apparatus may include various interface functions corresponding to the image acquisition devices (cameras), and the interface functions may be used to receive the control commands sent by the user or the upper layer so as to call the corresponding control software to control the image acquisition devices to perform corresponding functions.

Figure 7:
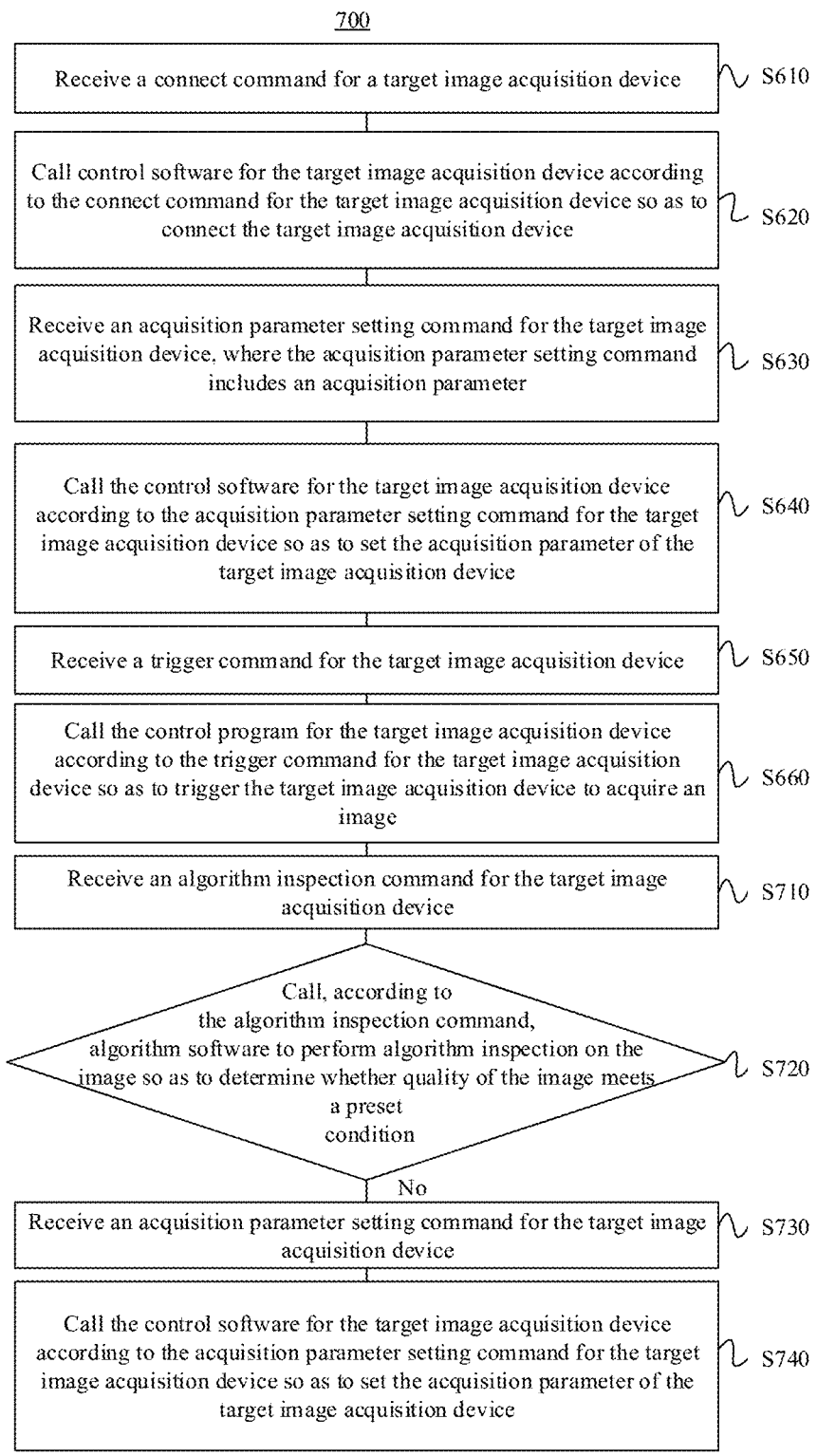
FIG. 7 is a schematic flowchart of another debugging method for production line devices according to an embodiment of this application.

On the basis of the embodiment shown in FIG. 6, FIG. 7 is a schematic flowchart of another debugging method 700 for production line devices according to an embodiment of this application.

As shown in FIG. 7, in addition to the foregoing steps S610 to S660 described above, the debugging method 700 for production line devices may further include the following steps.

S710: Receive an algorithm inspection command for the target image acquisition device.

S720: Call, according to the algorithm inspection command, an algorithm program to perform algorithm inspection on the image so as to determine whether quality of the image meets a preset condition.

Optionally, the debugging method 700 in this embodiment of this application may also be executed by the debugging apparatus described above.

After the debugging apparatus triggers the target image acquisition device to acquire an image, the debugging apparatus may further perform algorithm inspection on the image acquired by the target image acquisition device, such that the image acquired by the target image acquisition device can meet actual needs.

Optionally, in step S710, the debugging apparatus may receive an algorithm inspection command for the image of the target image acquisition device. In step S720, the debugging apparatus may include an algorithm inspection interface. After receiving the algorithm inspection command, the algorithm inspection interface calls an algorithm program to perform algorithm inspection on the image, where the algorithm includes but is not limited to a point inspection algorithm, an image consistency algorithm, and the like. The embodiments of this application impose no specific limitation on the specific algorithm type, so long as the algorithm is capable of evaluating the quality of the image.

Further, as shown in FIG. 7, under the condition that the quality of the image does not meet the preset condition as found by the algorithm inspection, the debugging method 700 further includes the following steps.

S730: Receive an acquisition parameter setting command for the target image acquisition device.

S740: Call the control program for the target image acquisition device according to the acquisition parameter setting command for the target image acquisition device so as to set the acquisition parameter of the target image acquisition device.

Specifically, under the condition that the quality of the image does not meet the preset condition, the debugging apparatus may further adjust the acquisition parameter of the target image acquisition device, such that the quality of the image acquired by the target image acquisition device can meet the algorithm requirements, thereby improving the debugging effect of the target image acquisition device.

Optionally, for the specific implementations of step S730 and step S740, reference may be made to the above relevant descriptions of steps S630 and S640, and details will not be repeated herein. After the acquisition parameter of the target image acquisition device is set, the trigger software can continue to control the target image acquisition device to acquire an image, and call the algorithm program to inspect the image again until the quality of the image acquired by the target image acquisition device is qualified.

The related embodiments in which the first devices are image acquisition devices have been described above with reference to FIG. 5 to FIG. 7, and the related embodiments in which the first devices provided in this application are light source control devices will be described below with reference to FIG. 8 and FIG. 9. In the plurality of light source control devices, each of the light source control devices may be connected to at least one light source. In an example, the light source includes but is not limited to an LED.

FIG. 8 is a schematic flowchart of another debugging method 800 for production line devices according to an embodiment of this application.

As shown in FIG. 8, the debugging method 800 for production line devices includes the following steps.

S810: Receive a light source on command and/or a light source off command for a target light source control device in the plurality of light source control devices.

S820: Call a control program for the target light source control device according to the light source on command for the target light source control device so as to control a light source corresponding to the target light source control device to turn on; and/or S830: Call the control program for the target light source control device according to the light source off command for the target light source control device so as to control the light source corresponding to the target light source control device to turn off.

Optionally, the foregoing step S810 may be an implementation of step S310 in the embodiment shown in FIG. 3 as described above, and step S820 and step S830 may be several implementations of step S320. Step S810 to step S830 in this embodiment of this application may also be executed by the debugging apparatus in the foregoing embodiments.

Specifically, in an embodiment of this application, the first function control command for the first device may include: a light source on command and/or light source off command for the light source control device. In step S810, the debugging apparatus may present to the user a list of light sources corresponding to each of the plurality of light source control devices, such that the user can input a light source on command and/or a light source off command for each of the light source control devices. Specifically, the user may input a light source on command and/or a light source off command for a target light source control device in the plurality of light source control devices, such that the debugging apparatus receives the light source on command and/or light source off command for the target light source control device.

In step S820, the debugging apparatus may include a light source on interface, where the light source on interface is configured to receive light source on commands for the plurality of light source control devices. Specifically, the debugging apparatus may receive the light source on command for the target light source control device and call the control program for the target light source control device to control the light source corresponding to the target light source control device to turn on.

In step S830, the debugging apparatus may include a light source off interface, where the light source off interface is configured to receive light source off commands for the plurality of light source control devices. Specifically, the debugging apparatus may receive the light source off command for the target light source control device and call the control program for the target light source control device to control the light source corresponding to the target light source control device to turn off.

The technical solution of this embodiment of this application provides a function of debugging a light source connected to the target light source control device in the plurality of light source control devices, facilitating the ability to inspect whether the target light source control device and the light source connected to the target light source control device are functioning properly, and allowing convenient control of the turn-on and turn-off of the light source according to actual needs.

Figure 9:
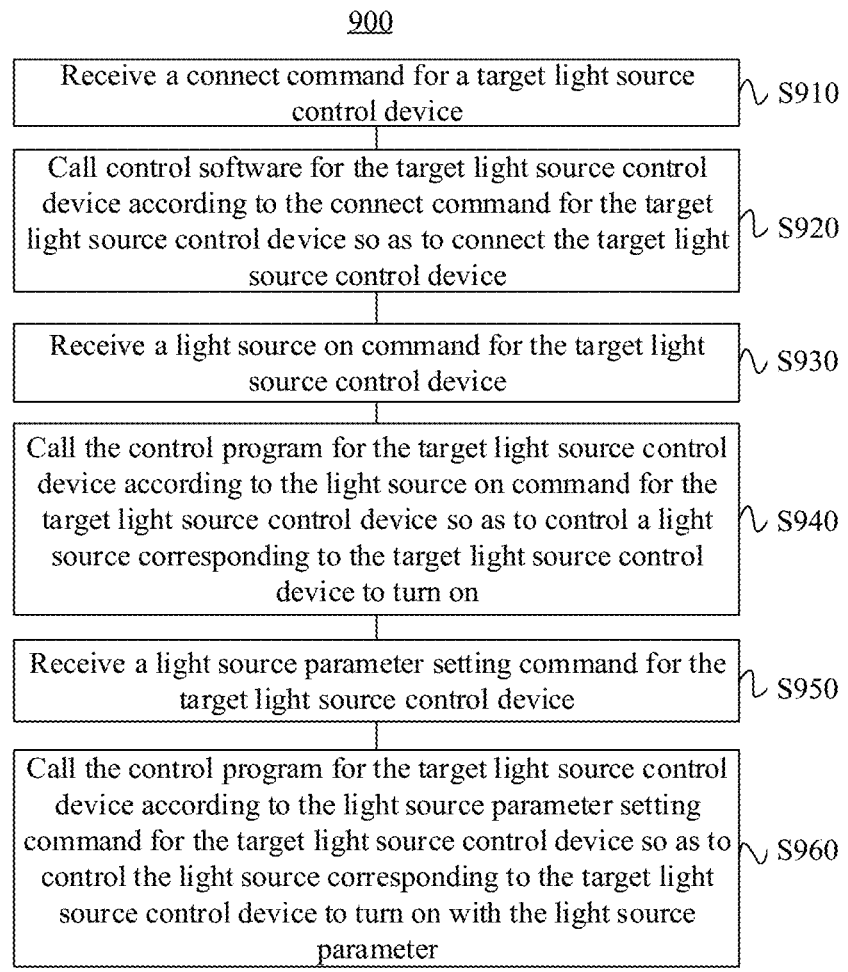
FIG. 9 is a schematic flowchart of another debugging method for production line devices according to an embodiment of this application.

On the basis of the embodiment shown in FIG. 8, FIG. 9 is a schematic flowchart of another debugging method 900 for production line devices according to an embodiment of this application.

As shown in FIG. 9, the debugging method 900 for production line devices includes the following steps.

S930: Receive a light source on command for the target light source control device.

S940: Call the control program for the target light source control device according to the light source on command for the target light source control device so as to control a light source corresponding to the target light source control device to turn on.

S950: Receive a light source parameter setting command for the target light source control device.

S960: Call the control program for the target light source control device according to the light source parameter setting command for the target light source control device so as to control the light source corresponding to the target light source control device to turn on with the light source parameter.

Optionally, the foregoing steps S930 and S950 may be several implementations of step S310 in the embodiment shown in FIG. 3 as described above, and steps S940 and S960 may be several implementations of step S320. The debugging method 900 in this embodiment of this application may also be executed by the debugging apparatus in the foregoing embodiments.

Specifically, for specific solutions of steps S930 and S940, reference may be made to the relevant descriptions of the embodiment shown in FIG. 8 described above, and details are not repeated herein.

In step S950, the first function control command for the first device may further include a light source parameter setting command for the light source control device. Specifically, the debugging apparatus may receive a light source parameter setting command for the target light source control device from a user, and the light source parameter setting command may be specifically for setting the light source corresponding to the target light source control device. Optionally, the light source parameter setting command may include related parameters of the light source, for example, intensity, illuminance, and chromaticity of the light source.

In step S960, the debugging apparatus may include a light source parameter setting interface, where the light source parameter setting interface is configured to receive light source parameter setting commands for the plurality of light source control devices from a user. Specifically, after receiving a light source parameter setting command for the target light source control device, the light source parameter setting interface may call the control program for the target light source control device to control the light source corresponding to the target light source control device to turn on with the light source parameter.

On the basis of turning on the light source corresponding to the target light source control device, the technical solution of this embodiment of this application further provides a debugging method for the light source parameter of the light source corresponding to the target light source control device, thereby further improving the comprehensiveness of debugging, such that the light source corresponding to the target light source control device has a better luminous effect and can meet different requirements in different environments.

Optionally, in the foregoing embodiment of this application, the target light source control device is correspondingly connected to N light sources, and the first function control command for the target light source control device includes a channel number X of a to-be-manipulated light source in the N light sources corresponding to the first light source control device, where X≤N, and X and N are both positive integers.

In this case, the debugging apparatus may call the control program for the target light source control device according to the first function control command for the target light source control device so as to control and manipulate the light source on the X-th channel that corresponds to the target light source control device.

In an example, under the condition that the first function control command for the target light source control device is a light source on command, the light source on command for the target light source control device may include a channel number X of a to-be-turned-on light source in the N light sources. In this case, the light source on interface in the debugging apparatus may call the control program for the target light source control device to control the light source on the X-th channel that corresponds to the target light source control device to turn on.

In another example, under the condition that the first function control command for the target light source control device is a light source parameter setting command, the light source parameter setting command for the target light source control device may include a channel number X of a to-be-adjusted light source in the N light sources. In this case, the light source parameter setting interface in the debugging apparatus may call the control program for the target light source control device to control the light source on the X-th channel that corresponds to the target light source control device to turn on with the light source parameter in the light source parameter setting command.

The technical solution of this implementation can provide a debugging method for the operations on each of the light sources corresponding to the target light source control device, such that each of the light sources can be separately debugged by using the debugging method, improving the accuracy and flexibility of debugging.

Optionally, in some embodiments, before the foregoing step S950, the debugging method 900 may further include: calling the control program for the target light source control device to acquire a current light source parameter of the target light source control device. By acquiring the current light source parameter of the target light source control device, the user can more accurately adjust the current light source parameter of the target light source control device.

Optionally, as shown in FIG. 9, before step S930, the debugging method 900 may further include the following steps S910 and S920.

S910: Receive a connect command for the target light source control device.

S920: Call control software for the target light source control device according to the connect command for the target light source control device so as to connect the target light source control device.

In this embodiment, the debugging apparatus may first implement a connection to the target light source control device. Under the condition that the connection is successful, the debugging apparatus acquires the light source on command for the target light source control device, and controls, according to the light source on command, the light source corresponding to the target light source control device to turn on.

Optionally, under the condition that the connection fails, the debugging apparatus may send an alert message to a user to alert the user of the connection failure, such that the user can locate the problem of the target light source control device that has failed to connect.

Optionally, in addition to controlling the light source via the light source control device as in the foregoing embodiment, in some other alternative embodiments, the debugging apparatus provided in this application may directly control the light source.

Optionally, the debugging apparatus may receive on commands for a plurality of light sources, and call control programs for the plurality of light sources respectively according to the on commands for the plurality of light sources so as to respectively control the plurality of light sources to turn on; and/or, the debugging apparatus may receive off commands for a plurality of light sources, and call control programs for the plurality of light sources respectively according to the off commands for the plurality of light sources so as to respectively control the plurality of light sources to turn off.

Optionally, the debugging apparatus may receive light source parameter setting commands for a plurality of light sources, and call control programs for the plurality of light sources respectively according to the light source parameter setting commands for the plurality of light sources so as to respectively control the plurality of light sources to turn on with a light source parameter in the light source parameter setting command.

For ease of understanding, the following shows various function interfaces in the debugging apparatus provided in the embodiments of this application which are used for the light source control devices and the function interfaces may specifically be interface functions.

```
virtual bool controllerCennect(const LightController::
    LightControllerConfigStruct& config); //connect the
    specified light source controller
virtual void controllerDisconnect (const LightCon-
    troller:: LightControllerConfigStruct& config); //dis-
    connect the specified light source controller
virtual bool isCennected (const LightController::
    LightControllerConfigStruct&  config);  //check
    whether the specified light source controller is con-
    nected
```

```
virtual bool turnOnChannel (const LightController::
    LightControllerConfigStruct& config, int Channel);
    //the specified light source controller turns on the
    specified channel
virtual bool turnOffChannel (const LightController::
    LightControllerConfigStruct& config, int Channel);
    //the specified light source controller turns off the
    specified channel
virtual bool setIntensity(const LightController:: Light-
    ControllerConfigStruct& config, int Channel, int
    value); //set the intensity of the specified channel of
    the light source controller
virtual int GetIntensity (const LightController:: Light-
    ControllerConfigStruct& config, int Channel,
    int*value); //get the intensity of the specified channel
    of the light source controller
virtual bool checkLight (const LightController:: Light-
    ControllerConfigStruct& config)=0; //check the light
    source controller
```

It can be known from the preceding code that the debugging apparatus may include various interface functions corresponding to the light source control devices (light source controllers), and the interface functions may be used to receive the control commands sent by the user or the upper layer so as to call the corresponding control software to control the light source control devices to perform corresponding functions.

The related embodiments in which the first devices are light source control devices have been described above with reference to FIG. 8 and FIG. 9, and the related embodiments in which the first devices provided in this application are production line control devices will be described below with reference to FIG. 10. The production line control device includes but is not limited to a PLC.

Figure 10:
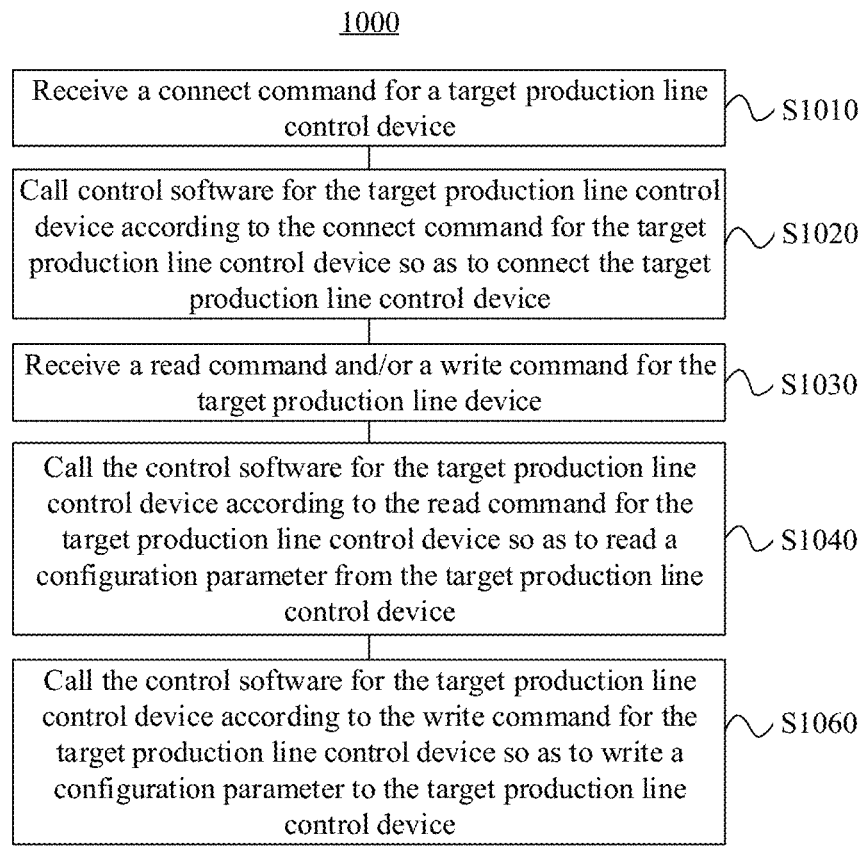
FIG. 10 is a schematic flowchart of another debugging method for production line devices according to an embodiment of this application.

FIG. 10 is a schematic flowchart of another debugging method 1000 for production line devices according to an embodiment of this application.

As shown in FIG. 10, the debugging method 1000 for production line devices includes the following steps.

S1030: Receive a read command and/or a write command for a target production line device in the plurality of production line control devices.

S1040: Call a control program for the target production line control device according to the read command for the target production line control device so as to read a configuration parameter from the target production line control device; and/or S1050: Call the control program for the target production line control device according to the write command for the target production line control device so as to write a configuration parameter to the target production line control device.

Optionally, the foregoing step S1030 may be an implementation of step S310 in the embodiment shown in FIG. 3 as described above, and step S1040 and step S1050 may be two implementations of step S320. The debugging method 1000 in this embodiment of this application may also be executed by the debugging apparatus in the foregoing embodiments.

Specifically, in step S1030, the debugging apparatus may receive a read command for the target production line control device in the plurality of production line control devices, where the read command may be used to instruct that a configuration parameter be read from the target production line control device, and the configuration parameter may be used for controlling a specific operation of the target production line control device or indicate an operating status. Optionally, the production line control device may be configured to control operations of a plurality of nodes in the production line, and the operation of each of the nodes may have a corresponding configuration parameter. In this step S1030, the debugging apparatus may read configuration parameters of the plurality of nodes from each of the production line control devices so as to present the configuration parameters to the user.

In step S1040, the debugging apparatus may include a read function interface, where the read function interface may be configured to receive read commands for the plurality of production line control devices. Specifically, after receiving a read command for the target production line control device, the read function interface calls the control program for the target production line control device to read a configuration parameter from the target production line control device.

Optionally, the read command includes indication information for indicating the target production line control device, for example, an IP address of the target production line control device. In addition, the read command may also include at least one of the following information about a to-be-read configuration parameter of the target production line control device: data type, data address, data length, and the like. The data type may include bit, byte, int, string, and the like. Embodiments of this application impose no limitation on the specific data type.

Optionally, for each data type, the debugging apparatus may provide one read function interface. To be specific, the debugging apparatus can provide a plurality of read function interfaces, and each of the read function interfaces is configured to receive read commands of one data type.

In addition to the read command, in an embodiment of this application, the debugging apparatus may also receive a write command for the target production line control device, where the write command may be used to instruct that a configuration parameter be written to the target production line control device.

Optionally, the debugging apparatus may include a write function interface, where the write function interface is configured to receive read commands for the plurality of production line control devices. Specifically, after receiving a read command for the target production line control device, the write function interface may call the control program for the target production line control device to read a configuration parameter from the target production line control device.

Optionally, the write command may carry a configuration parameter to be written. In addition, similar to the read command, the write command may also include indication information for indicating the target production line control device, for example, an IP address of the target production line control device. In addition, the write command may also include at least one of the following information of a to-be-written configuration parameter: data type, data address, data length, and the like. The data type may include bit, byte, int, string, and the like. The embodiments of this application impose no limitation on the specific data type.

Optionally, for each data type, the debugging apparatus may provide one write function interface. To be specific, the debugging apparatus can provide a plurality of write function interfaces, and each of the write function interfaces is configured to receive write commands of one data type.

Optionally, in some implementations, the debugging apparatus may first receive read commands, and read configuration parameters from the production line control devices; and then the user may determine new configuration parameters according to the configuration parameters read, and send write commands to the debugging apparatus so as to write the new configuration parameters to the production line control devices.

The technical solution of this embodiment of this application provides a debugging function for the target production line control device, such that a user can read a configuration parameter of the target production line control device to understand the operation of the production line control device, and/or a user can also write a configuration parameter to the target production line control device to adjust the operation of the target production line control device, thereby improving the overall debugging function and enabling the target production line control device to meet various actual needs.

Optionally, as shown in FIG. 10, before step S1030, the debugging method 1000 may further include the following steps S1010 and S1020.

S1010: Receive a connect command for the target production line control device.

S1020: Call the control program for the target production line control device according to the connect command for the target production line control device so as to connect the target production line control device.

In this embodiment, the debugging apparatus may first implement a connection to the target production line control device. Under the condition that the connection is successful, the debugging apparatus acquires the read command and/or write command for the target production line control device, and control the reading or writing of the configuration parameter of the target production line control device according to the read command and/or the write command.

Optionally, under the condition that the connection fails, the debugging apparatus may send an alert message to a user to alert the user of the connection failure, such that the user can locate the problem of the target production line control device that has failed to connect.

For ease of understanding, the following shows various function interfaces in the debugging apparatus provided in the embodiments of this application which are used for the production line control devices, and the function interfaces may specifically be interface functions.

virtual bool connectPLC (const QString &strPLCIP) const; //connect the PLC corresponding to the IP address virtual void closePLC (const QStringList &lstrPLCIP) const: //turn off the PLC corresponding to the IP address virtual bool closePLC (const QString &strPLCIP) const; //turn off the PLC corresponding to the IP address virtual bool MemoryAreaRead (const QString &strPLCIP, unsigned char area, uint16_t address, uint16_t count, int start=0); //read the memory of the PLC virtual int getMemoryAreaByte (const QString &strPLCIP, unsigned char area, uint16_t address, uint8_t*pData, int size, int start=0): //read one byte of data virtual bool MemoryAreaWrite (const QString &strPLCIP, unsigned char area, uint16_t address, uint16_t count, uint8_t data[ ], int start=0): //write to one memory area virtual bool MemoryAreaWriteBit(const QString &strPLCIP, unsigned char area, uint16_t address, uint8_t bit_position, uint8_t bit_dat, int start=0); //write one byte of data virtual uint8_getMemoryAreaBit(const QString &strPLCIP, unsigned char area, uint16_t address, uint8_t bit_position, int start=0); //read one bit of data virtual int getMemoryAreaInt (const QString &strPLCIP, unsigned char area, uint16_t address, int start=0); //read one int data virtual Qvector<int> getMemoryAreaIntArray(const QString &strPLCIP, unsigned char area, uint16_t address, int count, int start=0); //read one int array virtual bool MemoryAreaWriteInt(const QString &strPLCIP, unsigned char area, uint16_t address, int data, int start=0); //write one int data virtual bool MemoryAreaWriteInt(const QString &strPLCIP, unsigned char area, uint16_t address, Qvector<int> data, int start=0); //write one int vector virtual int getMemoryAreaStr(const QString &strPLCIP, unsigned char area, uint16_t address, char*pData, int size, int start=0); //read one string of characters virtual int getMemoryAreaWord(const QString &strPLCIP, unsigned char area, uint16_t address, char*pData, int size, int start=0); //read one word virtual bool MemoryAreaWriinspectr(const QString &strPLCIP, unsigned char area, uint16_t address, char*pData, int size, int start=0); //write one string of characters virtual void ResetConnect(const QString &strPLCIP); //reset connection virtual bool isConnectSucces(const QString &strPLCIP); //connection succeeded It can be known from the preceding code that the debugging apparatus may include various interface functions corresponding to the production line control devices (PLCs), and the interface functions may be used to receive the control commands sent by the user or the upper layer so as to call the corresponding control software to control the production line control devices to perform corresponding functions.

In the foregoing embodiments of this application, the debugging method for a plurality of first devices in a production line is described, where the first device may be any one of an image acquisition device, a light source control device, and a production line control device. In other embodiments, several types of devices in the foregoing devices may be debugged as well.

Figure 11:
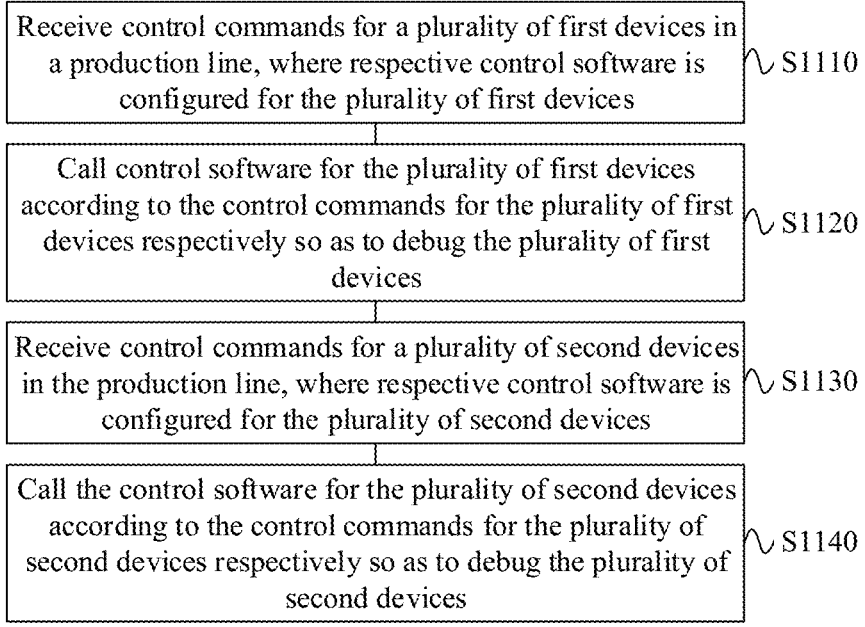
FIG. 11 is a schematic flowchart of another debugging method for production line devices according to an embodiment of this application.

On the basis of the embodiment shown in FIG. 2, FIG. 11 is a schematic flowchart of another debugging method 1100 for production line devices according to an embodiment of this application.

As shown in FIG. 11, the debugging method 1100 for production line devices includes the following steps.

S1110: Receive control commands for a plurality of first devices in a production line, where respective control programs are configured for the plurality of first devices.

S1120: Call the control programs for the plurality of first devices according to the control commands for the plurality of first devices respectively so as to debug the plurality of first devices.

S1130: Receive control commands for a plurality of second devices in the production line, where respective control programs are configured for the plurality of second devices, and the second devices function differently than the first devices.

S1140: Call the control programs for the plurality of second devices according to the control commands for the plurality of second devices respectively so as to debug the plurality of second devices.

Specifically, in an embodiment of this application, devices having various functions are provided in the production line. To be specific, a plurality of first devices having a first function and a plurality of second devices having a second function are provided in the production line.

In the debugging method provided in the embodiments of this application, not only the plurality of first devices but also the plurality of second devices can be debugged so as to implement a multi-purpose debugging method.

Optionally, the foregoing step S1110 to step S1140 may be executed by the same debugging apparatus, and the debugging apparatus may be provided with a plurality of screens, where a first screen is configured for debugging the plurality of first devices, and a second screen is configured for debugging the plurality of second devices, such that users can debug different types of devices in the production line via the same debugging apparatus, improving user experience.

Specifically, for the specific implementations of step S1110 and step S1120 in this embodiment of this application, reference may be made to the relevant descriptions of the foregoing embodiments.

Optionally, in steps S1130 and S1140, the first device and the second device are any two of the following devices respectively: an image acquisition device, a light source control device, and a production line control device. In this implementation, for the related debugging solution of the debugging apparatus for the second devices, reference may be made to the relevant descriptions of the foregoing embodiments, and details are not repeated herein.

In an example, under the condition that the first devices are image acquisition devices and the second devices are light source control devices, after the debugging software controls the image acquisition device to acquire an image, a user may examine the image quality of the image by using human eyes, or examine the image quality by using an algorithm. Under the condition that the human eye and/or the algorithm determines that the image quality does not meet the preset condition, the debugging software can adjust an acquisition parameter of the image acquisition device and/or a light source parameter corresponding to the light source control device, thereby adjusting and optimizing the performance of the entire production line system.

It can be understood that, in other implementations, the production line may be provided with more types of devices, and the same debugging apparatus provided in the embodiments of this application can debug more types of devices. In an example, the production line may be provided with image acquisition devices, light source control devices, and production line control devices, and the debugging apparatus may be provided with three debugging sub-screens, where a first debugging sub-screen is configured for debugging the plurality of image acquisition devices, a second debugging sub-screen is configured for debugging the plurality of light source control devices, and a third debugging sub-screen is configured for debugging the plurality of production line control devices.

Figure 12:
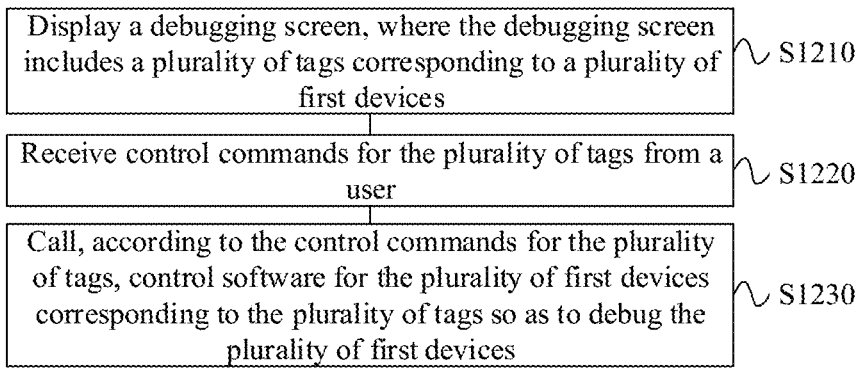
FIG. 12 is a schematic flowchart of another debugging method for production line devices according to an embodiment of this application.

FIG. 12 is a schematic flowchart of another debugging method 1200 for production line devices according to an embodiment of this application.

As shown in FIG. 12, the debugging method 1200 for production line devices includes the following steps.

S1210: Display a debugging screen, where the debugging screen includes a plurality of tags corresponding to a plurality of first devices.

S1220: Receive control commands for the plurality of tags from a user.

S1230: Call, according to the control commands for the plurality of tags, control programs for the plurality of first devices corresponding to the plurality of tags so as to debug the plurality of first devices.

Optionally, in this embodiment of this application, steps S1210 and S1220 may be an implementation of step S210 in the embodiment shown in FIG. 2 as described above. Step S1230 may be an implementation of step S220. The debugging method 1200 provided in this embodiment of this application may also be executed by the debugging apparatus in the foregoing embodiments.

Specifically, in step S1210, the debugging apparatus may display a debugging screen to the user, a host computer on which the debugging apparatus is located has a display device, and the debugging apparatus can cooperate with the display device to display the debugging screen to the user. The debugging screen includes a plurality of tags corresponding to the plurality of first devices, and a user may select a plurality of tags and perform operations on the plurality of tags, thereby generating control commands for the plurality of tags.

In steps S1220 and S1230, the debugging apparatus may receive operation commands for the plurality of tags input by the user via the debugging screen, and call, according to the control commands, the control programs for the plurality of first devices corresponding to the plurality of tags so as to debug the plurality of first devices. Specifically, for specific solutions of the calling the control programs so as to debug the plurality of first devices, reference may be made to the relevant descriptions of the embodiments described above, and details are not repeated herein.

Optionally, in some implementations, the debugging screen further includes a first function operation area corresponding to the plurality of tags. In this case, the preceding step S1220 may include: receiving control commands for the first function operation area corresponding to the plurality of tags.

Specifically, in addition to including the plurality of tags corresponding to the plurality of first devices, the debugging screen further includes one same first function operation area corresponding to the plurality of first devices. Optionally, the first function operation area may be provided in a form of button, input window, slider, drop-down window, or the like. The embodiments of this application do not specifically limit the form of the first function operation area, so long as the first function operation area allows users to operate it.

After the user operates the first function operation area, the first function control command in the foregoing embodiments may be produced. Specifically, after the user selects a first target device from the plurality of first devices and operates the first function operation area, a first function control command for the first target device can be produced, and the debugging apparatus may call a control program for the first target device according to the first function control command so as to control the first target function device to perform the first function.

In the technical solution of this embodiment of this application, the debugging screen can provide the user with one same first function operation area corresponding to a plurality of first devices, and by selecting tabs corresponding to different first devices and performing operation on that same first function operation area, the user can control different first devices to perform the first function, thereby simplifying the overall design of the debugging screen and improving the experience of the user in debugging a plurality of first devices.

As mentioned above, the first function control area may correspond to the first function control command in the foregoing embodiments. When the first devices are different devices, the first function control area and the first function control command can be adjusted and designed according to actual needs.

Figure 13:
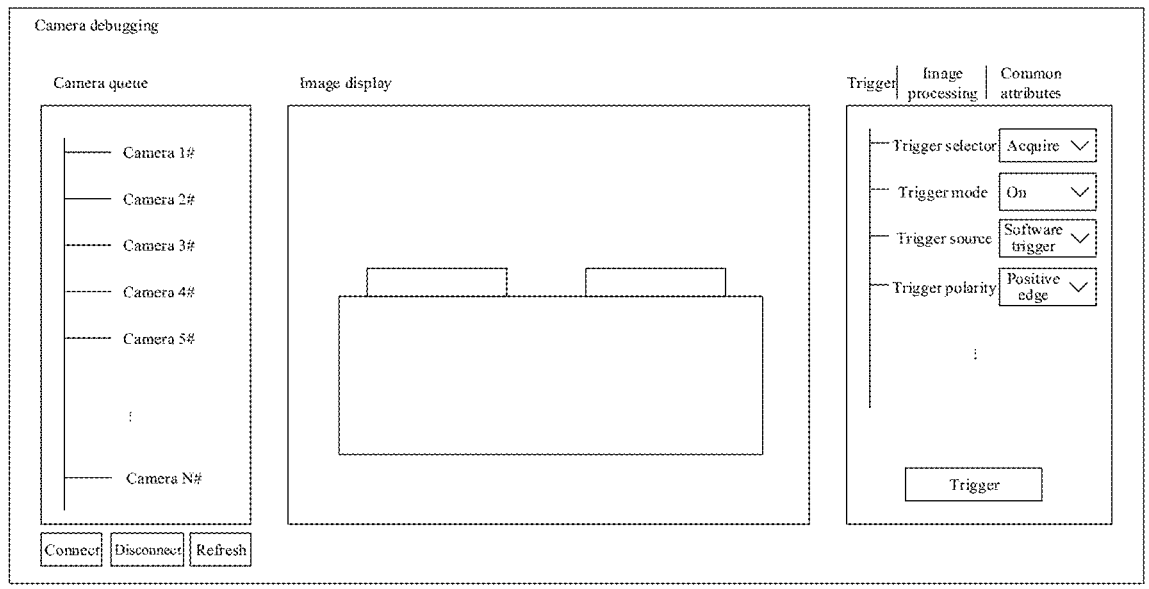
FIG. 13 is a schematic diagram of a camera debugging screen according to an embodiment of this application.

In an example, under the condition that the plurality of first devices are a plurality of cameras, FIG. 13 is a schematic diagram of a camera debugging screen according to an embodiment of this application.

As shown in FIG. 13, the camera debugging screen may include three windows, where a first window displays a camera queue of a plurality of cameras in the production line, a second window displays pictures captured by the cameras, and a third window displays control options such as trigger.

Optionally, below the first window, the debugging screen may be provided with a connect button, a disconnect button, and a refresh button. After selecting a target camera in the first window, a user may implement relevant operations on the target camera by clicking buttons such as connect and disconnect. Similarly, the user may also control parameters such as trigger selector, trigger mode, trigger source, and trigger polarity, of the target camera in the third window, and may use the trigger button in the third window to trigger the target camera to acquire an image. The image acquired by the target camera can be displayed in the second window in real time.

According to the manner described above, the user can control the plurality of cameras in the camera list so as to debug the plurality of cameras.

Optionally, in addition to the trigger control option, the third window may also provide image processing options and common attribute options. The image processing option may include at least one algorithm image processing option, for example, a spot detection algorithm image processing option and an image consistency algorithm image processing option. The common attribute options may display relevant attribute parameters of the camera, such that a user can obtain them in real time and adjust them according to actual needs.

It can be understood that the debugging screen shown in FIG. 13 is for illustration only but not for limitation, and the layout of the windows and the design of various function operation areas can be specifically adjusted according to actual needs. Embodiments of this application impose no limitations in this sense.

Figure 14:
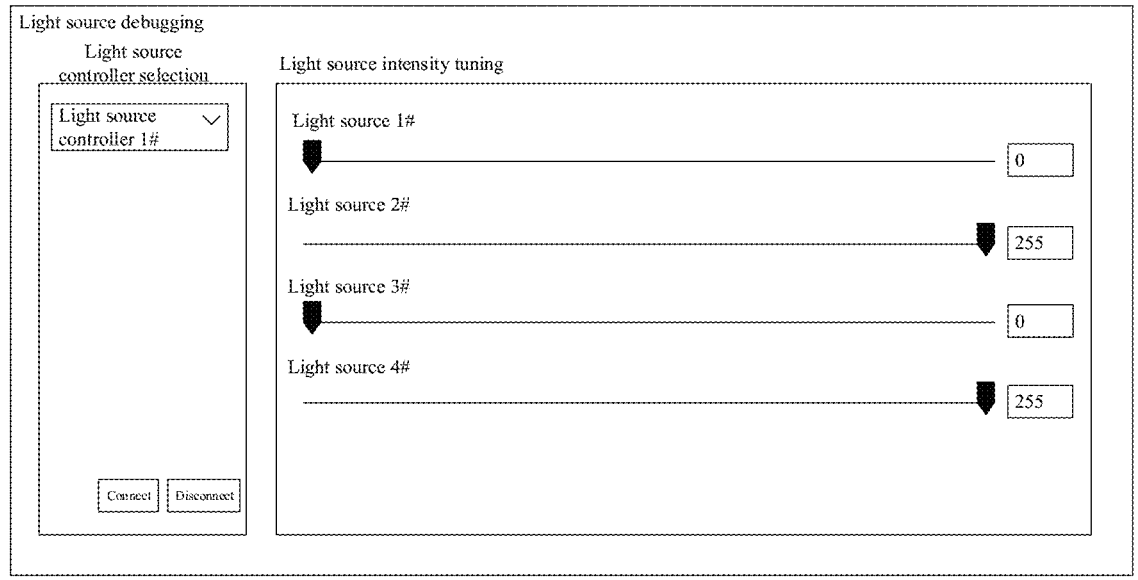
FIG. 14 is a schematic diagram of a light source debugging screen according to an embodiment of this application.

In another example, under the condition that the plurality of first devices are a plurality of light source controllers, FIG. 14 is a schematic diagram of a light source debugging screen according to an embodiment of this application.

As shown in FIG. 14, the light source debugging screen may include two windows, where a first window is used for selecting a light source controller, and a second window is used for adjusting light source parameters, such as light source intensity.

Optionally, the first window may display a drop-down window including a plurality of light source controllers, and a user may select a target light source controller from the plurality of light source controllers in the drop-down window. In addition, the first window may also be provided with a connect button and a disconnection button. After selecting the target light source controller in the drop-down window, the user may realize relevant operations of the target light source controller by clicking the connect button and the disconnect button. The second window may be provided with a light source list corresponding to the target light source controller, and corresponding to each light source, the second window is provided with one slider and/or one input box, where the user may control parameters such as intensity of each light source by operating the slider and/or input box.

Optionally, in addition to displaying the plurality of light source controllers in a form of a drop-down window in the first window, the plurality of light source controllers may also be displayed to the user in other forms. In addition, in addition to the intensities of the light sources, other parameters of the light sources may also be adjusted and displayed in the second window. The embodiments of this application do not specifically limit the design of the first window and the second window in the light source debugging screen.

In a third example, under the condition that the plurality of first devices are a plurality of PLCs, FIG. 15 is a schematic diagram of a PLC debugging screen according to an embodiment of this application.

Optionally, in this implementation, when the debugging apparatus is started, it can be connected to different PLCs via parameters such as IP addresses of the PLCs. After being connected to a target PLC, a debugging screen corresponding to the target PLC, for example, the PLC debugging screen shown in FIG. 15, can be directly displayed to the user.

As shown in FIG. 15, the PLC debugging screen may include two windows, where a first window displays soft PLC elements (also called PLC nodes), and a second window is used for writing PLC configuration parameters.

Optionally, the debugging apparatus can read configuration parameters of a plurality of nodes of the target PLC from the target PLC and display them in the first window, where configuration parameters of each node may include information such as name, sign, address, bit, data type, length, read/write attribute (RW), and adjustment value.

In addition, the user may modify the configuration parameters of any one of the nodes in the second window. For example, when the user chooses to modify the configuration parameters of a target node in the plurality of nodes, the user may modify the configuration parameters of the target node in the second window, for example, modifying the adjustment value; and then after the user clicks a write button, the configuration parameters in the second window can be written to the target node by the debugging apparatus, and the configuration parameters can be saved to a configuration file.

Optionally, the configuration parameter information displayed in the first window and the second window is only an example rather than a limitation, and the configuration parameter information may be designed according to actual needs. Embodiments of this application impose no specific limitation in this sense.

Figure 16:
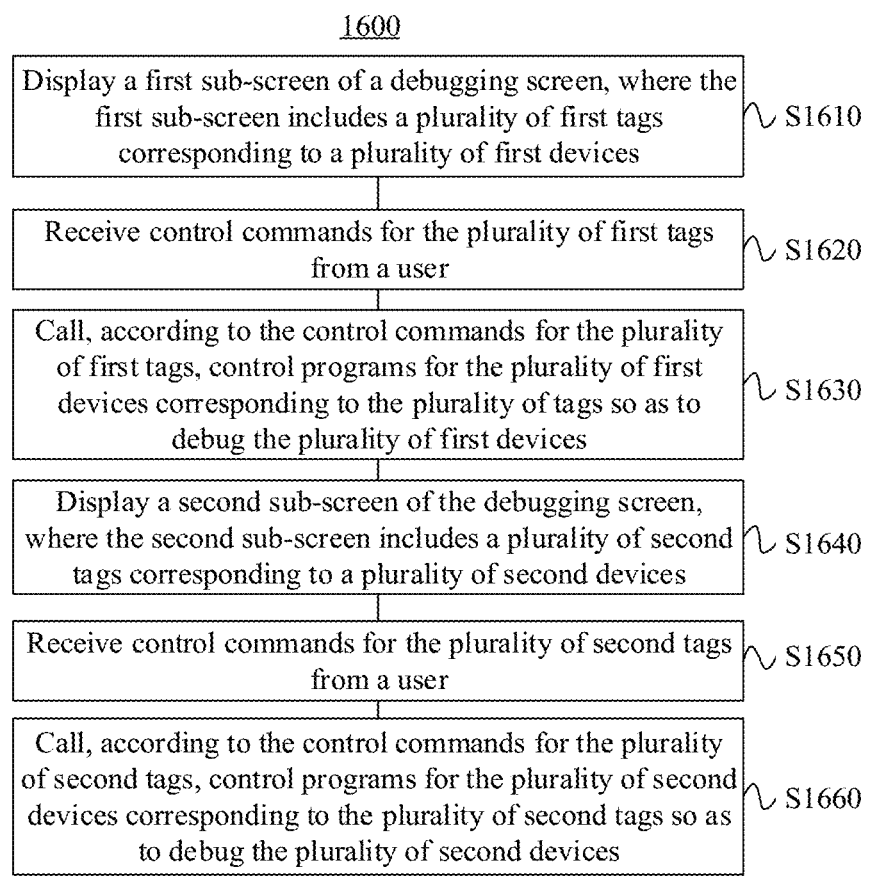
FIG. 16 is a schematic flowchart of another debugging method for production line devices according to an embodiment of this application.

FIG. 16 is a schematic flowchart of another debugging method 1600 for production line devices according to an embodiment of this application.

As shown in FIG. 16, the debugging method 1600 for production line devices includes the following steps.

S1610: Display a first sub-screen of the debugging screen, where the first sub-screen includes a plurality of first tags corresponding to a plurality of first devices.

S1620: Receive control commands for the plurality of first tags from a user.

S1630: Call, according to the control commands for the plurality of first tags, control programs for the plurality of first devices corresponding to the plurality of tags so as to debug the plurality of first devices.

S1640: Display a second sub-screen of the debugging screen, where the second sub-screen includes a plurality of second tags corresponding to the plurality of second devices.

S1650: Receive control commands for the plurality of second tags from a user.

S1660: Call, according to the control commands for the plurality of second tags, control programs for the plurality of second devices corresponding to the plurality of second tags so as to debug the plurality of second devices.

Optionally, in this embodiment of this application, steps S1610 and S1620 may be an implementation of step S1110 in the embodiment shown in FIG. 11 described above, step S1630 may be an implementation of step S1120, steps S1640 and S1650 may be an implementation of step S1130, and step S1660 may be an implementation of step S1140. The debugging method 1600 in this embodiment of this application may also be executed by the debugging apparatus in the foregoing embodiments.

Specifically, in an embodiment of this application, the debugging screen that the debugging apparatus may present to the user a debugging screen that includes a plurality of sub-screens, where a first sub-screen includes the plurality of first tags corresponding to the plurality of first devices, and the first sub-screen is used for testing and debugging the plurality of first devices, and similarly, a second sub-screen corresponds to the plurality of second tags of the plurality of second devices, and the second sub-screen is used for testing and debugging the plurality of second devices.

In the technical solution of this embodiments of this application, the debugging apparatus can provide the user with debugging sub-screens for various types of devices, facilitating the debugging of various types of devices by using one same debugging apparatus, thereby further improving the debugging experience of the user.

Optionally, the first device and the second device are any two of the following devices respectively: an image acquisition device, a light source control device, and a production line control device. In this implementation, for the related solutions of the debugging apparatus for the first sub-screen and the second sub-screen respectively corresponding to the first devices and the second devices, reference may be made to the relevant descriptions of any one of the embodiments shown in FIG. 13 to FIG. 15, and details are not repeated herein.

Certainly, in other embodiments, under the condition that the production line includes more types of devices, the debugging apparatus can also present more sub-screens to the user. For example, the debugging apparatus can include all the screens in FIG. 13 to FIG. 15 such that the user can debug the various types of devices.

Optionally, the debugging method of any one of the foregoing embodiments can be applied to a battery production line. The debugging method can optimize the performance of production line devices in the battery production line, which is conducive to improving the production efficiency and product yield of the battery production line.

The method embodiments provided in this application have been described above with reference to FIG. 2 to FIG. 16, and the apparatus embodiments provided in this application will be described below with reference to FIG. 17 to FIG. 23. It can be understood that the apparatus embodiments correspond to the foregoing method embodiments. For specific solutions, refer to the relevant discussions above.

Figure 17:
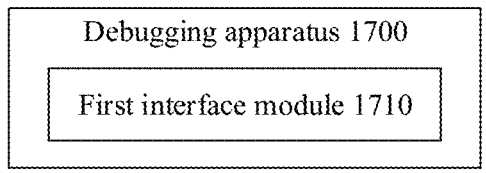
FIG. 17 is a schematic block diagram of a structure of a debugging apparatus for production line devices according to an embodiment of this application.

FIG. 17 is a schematic block diagram of a structure of a debugging apparatus 1700 for production line devices according to an embodiment of this application.

As shown in FIG. 17, the debugging apparatus 1700 may include a first interface module 1710.

Specifically, the first interface module 1710 is configured to: receive control commands for a plurality of first devices in a production line, where respective control programs are configured for the plurality of first devices; and call the control programs for the plurality of first devices according to the control commands for the plurality of first devices respectively so as to debug the plurality of first devices.

Optionally, in an embodiment of this application, the first interface module 1710 may include a software interface, where the software interface may be configured to: receive control commands for the plurality of first devices from a user or an upper-level apparatus, and call control programs for the plurality of first devices from a lower-level apparatus to control and debug the plurality of first devices.

In some possible implementations, the first interface module 1710 includes a first function interface. The first function interface is configured to: receive first function control commands for the plurality of first devices; and call the control programs for the plurality of first devices according to the first function control commands for the plurality of first devices respectively so as to execute a first function on each of the plurality of first devices.

Optionally, the first function interface may be an interface function in a software interface, which is used to call the function programs corresponding to the plurality of first devices so as to control the plurality of first devices to execute the first function.

In some possible implementations, the plurality of first devices include a first target device, and the first function control command includes a connect command and/or a disconnect command; and the first function interface includes a connect function interface and/or a disconnect function interface, where the connect function interface is configured to: call a control program for the first target device according to a connect command for the first target device so as to connect the first target device; and/or call the control program for the first target device according to a disconnect command for the first target device so as to disconnect the first target device.

In some possible implementations, the plurality of first devices include a plurality of image acquisition devices. In this case, FIG. 18 is a schematic block diagram of a structure of another debugging apparatus 1800 for production line devices according to an embodiment of this application.

Figure 18:
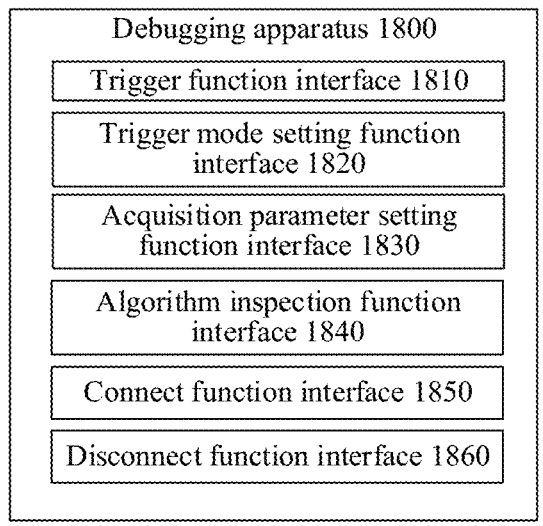
FIG. 18 is a schematic block diagram of a structure of another debugging apparatus for production line devices according to an embodiment of this application.

As shown in FIG. 18, in the debugging apparatus 1800, the first function interface includes a trigger function interface 1810 configured to call, according to a trigger command for a target image acquisition device in the plurality of image acquisition devices, a control program for the target image acquisition device so as to trigger the target image acquisition device to acquire an image.

In some possible implementations, the first function control command further includes a hardware trigger mode setting command and/or a software trigger mode setting command; and the first function interface further includes a trigger mode setting function interface 1820, as shown in FIG. 18. The trigger mode setting function interface 1820 includes: a hardware trigger mode setting function interface and/or a software trigger mode setting function interface, where the hardware trigger mode setting function interface is configured to call the control program for the target image acquisition device according to a hardware trigger mode setting command for the target image acquisition device so as to set a trigger mode of the target image acquisition device to a hardware trigger mode; and/or the software trigger mode setting function interface is configured to call the control program for the target image acquisition device according to a software trigger mode setting command for the target image acquisition device so as to set a trigger mode of the target image acquisition device to a software trigger mode.

In some possible implementations, the first function control command further includes an acquisition parameter setting command, where the acquisition parameter setting command includes an acquisition parameter; and as shown in FIG. 18, the first function interface further includes an acquisition parameter setting function interface 1830 configured to call the control program for the target image acquisition device according to an acquisition parameter setting command for the target image acquisition device so as to set the acquisition parameter of the target image acquisition device.

In some possible implementations, the acquisition parameter includes a gain parameter and/or exposure time.

In some possible implementations, the first function control command further includes an image acquisition start command and/or a trigger mode enable command; and the first function interface further includes an image acquisition start function interface and/or a trigger mode enable function interface, where the image acquisition start function interface is configured to call the control program for the target image acquisition device according to an image acquisition start command for the target image acquisition device so as to control the target image acquisition device to start an image acquisition function; and/or the trigger mode enable function interface is configured to call the control program for the target image acquisition device according to a trigger mode enable command for the target image acquisition device so as to control the target image acquisition device to start a trigger mode function.

Corresponding to the image acquisition start function interface and/or the trigger mode enable function interface, the first function interface may further include: an image acquisition stop function interface and/or a trigger mode disable function interface.

In some possible implementations, as shown in FIG. 18, the first function interface further includes an algorithm inspection function interface 1840 configured to: receive an algorithm inspection command for the image; and call, according to the algorithm inspection command, an algorithm program to examine the image so as to determine whether quality of the image meets a preset condition.

In some possible implementations, under the condition that the quality of the image does not meet the preset condition, the parameter acquisition function interface 1830 is configured to: receive an acquisition parameter setting command for the target image acquisition device; and call the control program for the target image acquisition device according to the acquisition parameter setting command for the target image acquisition device so as to set the acquisition parameter of the target image acquisition device.

In addition, as shown in FIG. 18, the debugging apparatus 1800 may further include a connect function interface 1850 and/or a disconnect function interface 1860 configured to implement a connection and/or disconnection test for the plurality of image acquisition devices.

In some possible implementations, the plurality of first devices include a plurality of light source control devices, and each of the light source control devices is connected to at least one light source. For this case, FIG. 19 is a schematic block diagram of a structure of another debugging apparatus 1900 for production line devices according to an embodiment of this application.

Figure 19:
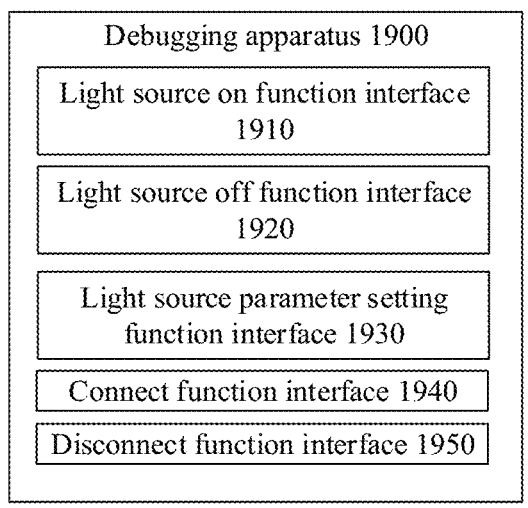
FIG. 19 is a schematic block diagram of a structure of another debugging apparatus for production line devices according to an embodiment of this application.

As shown in FIG. 19, in the debugging apparatus 1900, the first function interface includes a light source on function interface 1910 and/or a light source off function interface 1920, where the light source on function interface 1910 is configured to call, according to a light source on command for a target light source control device in the plurality of light source control devices, a control program for the target light source control device so as to control a light source corresponding to the target light source control device to turn on; and/or the light source off function interface 1920 is configured to call, according to a light source off command for a target light source control device in the plurality of light source control devices, a control program for the target light source control device so as to control the light source corresponding to the target light source control device to turn off.

In some possible implementations, the first function control command further includes a light source parameter setting command, where the light source parameter setting command includes a light source parameter. As shown in FIG. 19, the first function interface includes a light source parameter setting function interface 1930 configured to call, according to a light source parameter setting command for the target light source control device, a control program for the target light source control device so as to control the light source corresponding to the target light source control device to turn on with the light source parameter.

In addition, as shown in FIG. 19, the debugging apparatus 1900 may further include a connect function interface 1940 and/or a disconnect function interface 1950 configured for implementing a connection and/or disconnection test for the plurality of light source control devices.

In some possible implementations, the plurality of first devices include a plurality of production line control devices. For this case, FIG. 20 is a schematic block diagram of a structure of another debugging apparatus 2000 for production line devices according to an embodiment of this application.

Figure 20:
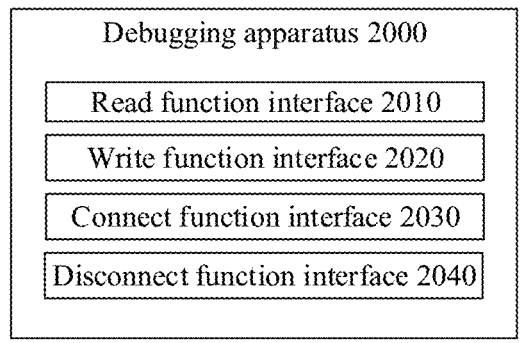
FIG. 20 is a schematic block diagram of a structure of another debugging apparatus for production line devices according to an embodiment of this application.

As shown in FIG. 20, in the debugging apparatus 2000, the first function interface includes a read function interface 2010 and/or a write function interface 2020. The read function interface 2010 is configured to call, according to a read command for a target production line control device in the plurality of production line control devices, a control program for the target production line control device so as to read a configuration parameter from the target production line control device; and/or the write function interface 2020 is configured to call, according to a write command for a target production line control device in the plurality of production line control devices, a control program for the target production line control device so as to write a configuration parameter to the target production line control device.

In some possible implementations, the read command includes at least one of the following information of a to-be-read configuration parameter: data type, data address, and data length; and/or the write command includes at least one of the following information of a to-be-written configuration parameter: data type, data address, and data length.

In addition, as shown in FIG. 20, the debugging apparatus 2000 may further include a connect function interface 2030 and/or a disconnect function interface 2040 configured to implement a connection and/or disconnection tests for a plurality of production line control devices.

Figure 21:
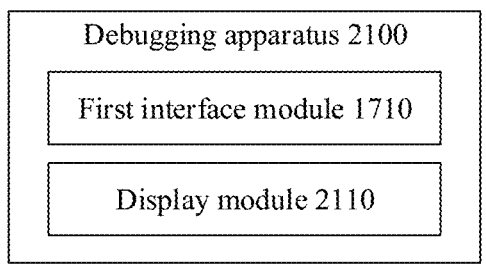
FIG. 21 is a schematic block diagram of a structure of another debugging apparatus for production line devices according to an embodiment of this application.

FIG. 21 is a schematic block diagram of a structure of another debugging apparatus 2100 for production line devices according to an embodiment of this application.

As shown in FIG. 21, in this embodiment of this application, in addition to the first interface module 1710 in the foregoing embodiment, the debugging apparatus 2100 may further include a display module 2110. The display module 2110 is configured to display a debugging screen. The debugging screen includes a plurality of tags corresponding to a plurality of first devices. The first interface module 1710 is configured to: receive control commands for the plurality of tags from a user, and call, according to the control commands for the plurality of tags, control programs for the plurality of first devices corresponding to the plurality of tags so as to debug the plurality of first devices.

In some possible implementations, the debugging screen further includes a first function operation area corresponding to the plurality of tags; and the first interface module 1710 is configured to receive control commands for the first function operation area corresponding to the plurality of tags from the user.

Figure 22:
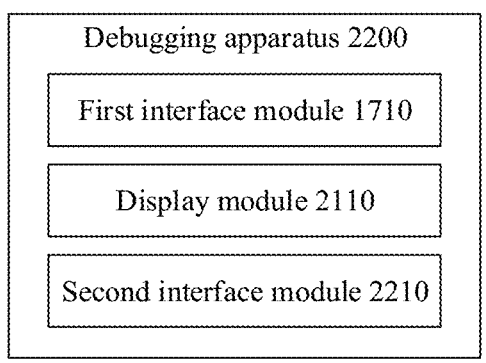
FIG. 22 is a schematic block diagram of a structure of another debugging apparatus for production line devices according to an embodiment of this application.

FIG. 22 is a schematic block diagram of a structure of another debugging apparatus 2200 for production line devices according to an embodiment of this application.

As shown in FIG. 22, in this embodiment of this application, in addition to the first interface module 1710 in the foregoing embodiment, the debugging apparatus 2200 further includes a second interface module 2210. The second interface module 2210 is configured to: receive control commands for a plurality of second devices in the production line, where respective control programs are configured for the plurality of second devices, and the second devices function differently than the first devices; and call the control programs for the plurality of second devices according to the control commands for the plurality of second devices respectively so as to debug the plurality of second devices.

In some possible implementations, the second device is any one of the following devices: an image acquisition device, a light source control device, and a production line control device.

In some possible implementations, as shown in FIG. 22, the debugging apparatus 2200 further includes a display module 2110 configured to display a first sub-screen of the debugging screen, where the first sub-screen includes a plurality of first tags corresponding to the plurality of first devices; the first interface module 1710 is configured to receive control commands for the plurality of first tags from a user; the display module 2110 configured to display a second sub-screen of the debugging screen, where the second sub-screen includes a plurality of second tags corresponding to the plurality of second devices; and the second interface module 2210 is configured to receive control commands for the plurality of second tags from a user.

Alternatively, in the embodiments shown in FIG. 21 and FIG. 22, the first interface module 1710 may include a plurality of function modules in any one of the embodiments shown in FIG. 18 to FIG. 20. The second interface module 2210 and the first interface module 1710 are adaptable to different production line devices, and the second interface module 1710 may also include a plurality of function modules in any one of the foregoing embodiments in FIG. 18 to FIG. 20.

Figure 23:
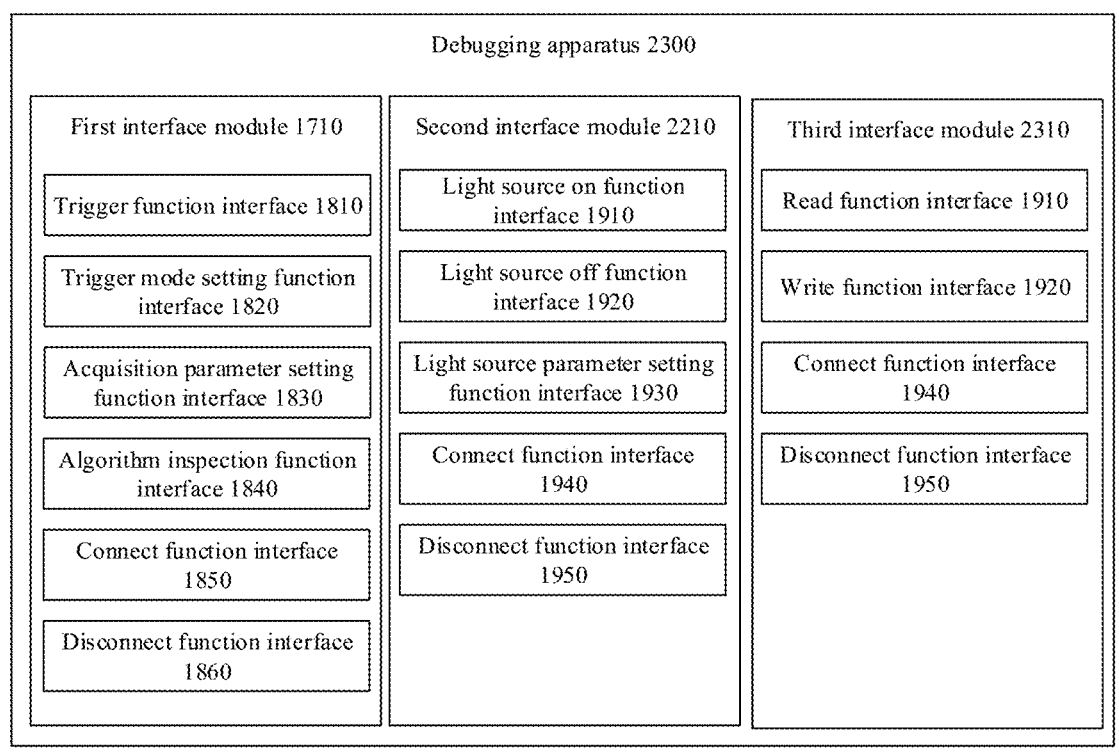
FIG. 23 is a schematic block diagram of a structure of another debugging apparatus for production line devices according to an embodiment of this application.

FIG. 23 is a schematic block diagram of a structure of another debugging apparatus 2300 for production line devices according to an embodiment of this application.

As shown in FIG. 23, in the embodiment of this application, the debugging apparatus 2300 may include a first interface module 1710, a second interface module 2210, and a third interface module 2310. The first interface module 1710, the second interface module 2210, and the third interface module 2310 may correspond to image acquisition devices, light source control devices, and production line control devices respectively so as to respectively control the three devices to perform corresponding operations and debugging.

In an example, as shown in FIG. 23, the first interface module 1710 may include the function interfaces shown in FIG. 18, the second interface module 2210 may include the function interfaces shown in FIG. 19, and the third interface module 2310 may include the function interfaces shown in FIG. 20.

In some possible implementations, the debugging apparatus provided in any one of the foregoing embodiments may be applied to a battery production line.

An embodiment of this application further provides a debugging apparatus for production line devices, including a processor and a memory, where the memory is configured to store a program, and the processor is configured to call and run the program from the memory to execute the debugging method according to any one of the foregoing embodiments.

An embodiment of this application further provides a computer-readable storage medium, where the computer-readable storage medium stores a computer program, and when the computer program is run on a computer device, the computer device is enabled to execute the debugging method according to any one of the foregoing embodiments.

An embodiment of this application further provides a computer program product including a computer program, where when the computer program is run on a computer device, the computer device is enabled to execute the debugging method according to any one of the foregoing embodiments.

An embodiment of this application further provides a chip. The chip includes a processor and a data interface. The processor reads, via the data interface, instructions stored in a memory so as to execute the debugging method according to any one of the foregoing embodiments.

An embodiment of this application further provide a production line system including production line devices and the debugging apparatus according to any one of the foregoing embodiments. The production line devices may include the image acquisition devices, light source control devices, and production line control devices in the foregoing embodiments.

Optionally, in some implementations, the production line system may be a battery production line system.

Although this application has been described with reference to some preferred embodiments, various modifications can be made to this application and components in this application can be replaced with equivalents, without departing from the scope of this application. In particular, as long as there is no structural conflict, the various technical features mentioned in the embodiments can be combined in any manners. This application is not limited to the specific embodiments disclosed in this specification, but includes all technical solutions falling within the scope of the claims.

The invention claimed is:

1. A debugging method for production line devices, comprising:
   receiving control commands for a plurality of first devices disposed at different environments in a production line, wherein respective control programs are configured for the plurality of first devices;

calling the control programs for the plurality of first devices according to the control commands for the plurality of first devices respectively so as to debug individually the plurality of first devices to enable the plurality of first devices to meet requirements of the different environments respectively in the production line;

receiving first function control commands for the plurality of first devices; and calling the control programs for the plurality of first devices according to the first function control commands for the plurality of first devices respectively so as to execute a first function on each of the plurality of first devices, wherein the plurality of first devices comprise a first target device, and the first function control command comprises a connect command and a disconnect command; and wherein the calling the control programs for the plurality of first devices according to the first function control commands for the plurality of first devices respectively so as to execute a first function on each of the plurality of first devices comprises:

calling a control program for the first target device according to a connect command for the first target device so as to connect the first target device via a connect function interface, the connect function interface configured to receive connect commands for the plurality of first devices;

calling the control program for the first target device according to a disconnect command for the first target device so as to disconnect the first target device via a disconnect function interface, the disconnect function interface configured to receive disconnect commands for the plurality of first devices; and wherein the plurality of first devices comprise a plurality of image acquisition devices, and the first function control command comprises a trigger command; wherein the calling the control programs for the plurality of first devices according to the first function control commands for the plurality of first devices respectively so as to execute a first function on each of the plurality of first devices comprises: calling, according to a trigger command for a target image acquisition device in the plurality of image acquisition devices, a control program for the target image acquisition device so as to trigger the target image acquisition device to acquire an image.

2. The debugging method according to claim 1, wherein the first function control command further comprises a hardware trigger mode setting command and/or a software trigger mode setting command; and before the calling, according to a trigger command for a target image acquisition device, a control program for the target image acquisition device so as to trigger the target image acquisition device to acquire an image, the triggering method further comprises:

calling the control program for the target image acquisition device according to a hardware trigger mode setting command for the target image acquisition device so as to set a trigger mode of the target image acquisition device to a hardware trigger mode; and/or calling the control program for the target image acquisition device according to a software trigger mode setting command for the target image acquisition device so as to set a trigger mode of the target image acquisition device to a software trigger mode.

3. The debugging method according to claim 1, wherein the first function control command further comprises an acquisition parameter setting command, and the acquisition parameter setting command comprises an acquisition parameter; and before the calling, according to a trigger command for a target image acquisition device, a control program for the target image acquisition device so as to trigger the target image acquisition device to acquire an image, the debugging method further comprises:

calling the control program for the target image acquisition device according to an acquisition parameter setting command for the target image acquisition device so as to set the acquisition parameter of the target image acquisition device.

4. The debugging method according to claim 3, wherein the acquisition parameter comprises a gain parameter and/or an exposure time.

5. The debugging method according to claim 1, wherein the first function control command further comprises an image acquisition start command and/or a trigger mode enable command; and before the calling, according to a trigger command for a target image acquisition device, a control program for the target image acquisition device so as to trigger the target image acquisition device to acquire an image, the debugging method further comprises:

calling the control program for the target image acquisition device according to an image acquisition start command for the target image acquisition device so as to control the target image acquisition device to start an image acquisition function; and/or calling the control program for the target image acquisition device according to a trigger mode enable command for the target image acquisition device so as to control the target image acquisition device to start a trigger mode function.

6. The debugging method according to claim 1, wherein after the calling, according to a trigger command for a target image acquisition device, a control program for the target image acquisition device so as to trigger the target image acquisition device to acquire an image, the debugging method further comprises:

receiving an algorithm inspection command for the image; and calling, according to the algorithm inspection command, an algorithm program to examine the image so as to determine whether quality of the image meets a preset condition.

7. The debugging method according to claim 6, wherein under the condition that the quality of the image does not meet the preset condition, the debugging method further comprises:

receiving an acquisition parameter setting command for the target image acquisition device; and calling the control program for the target image acquisition device according to the acquisition parameter setting command for the target image acquisition device so as to set the acquisition parameter of the target image acquisition device.

8. The debugging method according to claim 1, wherein the plurality of first devices comprise a plurality of light source control devices, wherein each of the light source control devices is connected to at least one light source, and the first function control command comprises a light source on command and/or a light source off command;

wherein the calling the control programs for the plurality of first devices according to the first function control commands for the plurality of first devices respectively so as to execute a first function on each of the plurality of first devices comprises:

calling, according to a light source on command for a target light source control device in the plurality of light source control devices, a control program for the target light source control device so as to control a light source corresponding to the target light source control device to turn on; and/or calling, according to a light source off command for a target light source control device in the plurality of light source control devices, the control program for the target light source control device so as to control the light source corresponding to the target light source control device to turn off.

9. The debugging method according to claim 8, wherein the first function control command further comprises a light source parameter setting command, and the light source parameter setting command comprises a light source parameter; and after the calling, according to a light source on command for a target light source control device, a control program for the target light source control device so as to control a light source corresponding to the target light source control device to turn on, the debugging method further comprises:

calling, according to a light source parameter setting command for the target light source control device, the control program for the target light source control device so as to control the light source corresponding to the target light source control device to turn on with the light source parameter.

10. The debugging method according to claim 1, wherein the plurality of first devices comprise a plurality of production line control devices, and the first function control command comprises a read command and/or a write command;

wherein the calling the control programs for the plurality of first devices according to the first function control commands for the plurality of first devices respectively so as to execute a first function on each of the plurality of first devices comprises:

calling, according to a read command for a target production line control device in the plurality of production line control devices, a control program for the target production line control device so as to read a configuration parameter from the target production line control device; and/or calling, according to a write command for a target production line control device in the plurality of production line control devices, the control program for the target production line control device so as to write a configuration parameter to the target production line control device.

11. The debugging method according to claim 10, wherein the read command comprises at least one of the following information of a to-be-read configuration parameter: data type, data address, and data length; and/or the write command comprises at least one of the following information of a to-be-written configuration parameter: data type, data address, and data length.

12. The debugging method according to claim 1, wherein the receiving control commands for a plurality of first devices in a production line comprises:

displaying a debugging screen, wherein the debugging screen comprises a plurality of tags corresponding to the plurality of first devices; and receiving control commands for the plurality of tags from a user; and the calling the control programs for the plurality of first devices according to the control commands for the plurality of first devices respectively so as to debug the plurality of first devices comprises:

calling, according to the control commands for the plurality of tags, the control programs for the plurality of first devices corresponding to the plurality of tags so as to debug the plurality of first devices.

13. The debugging method according to claim 12, wherein the debugging screen further comprises a first function operation area corresponding to the plurality of tags; and the receiving control commands for the plurality of tags from a user comprises:

receiving control commands for the first function operation area corresponding to the plurality of tags from the user.

14. The debugging method according to claim 1, wherein the debugging method further comprises:

receiving control commands for a plurality of second devices in the production line, wherein respective control programs are configured for the plurality of second devices, and the second devices function differently than the first devices; and calling control programs for the plurality of second devices according to the control commands for the plurality of second devices respectively so as to debug the plurality of second devices.

15. The debugging method according to claim 14, wherein the second device is any one of the following devices: an image acquisition device, a light source control device, and a production line control device.

16. The debugging method according to claim 14, wherein the receiving control commands for a plurality of first devices in a production line comprises:

displaying a first sub-screen of the debugging screen, wherein the first sub-screen comprises a plurality of first tags corresponding to the plurality of first devices; and receiving control commands for the plurality of first tags from a user; and the receiving control commands for a plurality of second devices in the production line comprises:

displaying a second sub-screen of the debugging screen, wherein the second sub-screen comprises a plurality of second tags corresponding to the plurality of second devices; and receiving control commands for the plurality of second tags from a user.

17. The debugging method according to claim 1, wherein the debugging method is applied to a battery production line.

18. The debugging method according to claim 1, wherein the production line is a battery production line and the plurality of first devices include a plurality of visual inspection devices.

19. The debugging method according to claim 1, wherein the debugging method comprises calling the control programs for the plurality of first devices according to the first function control commands for the plurality of first devices respectively so as to execute the first function on each of the plurality of first devices respectively to inspect whether each of the plurality of first devices perform the first function properly.

\* \* \* \* \*